United States Patent [19]

Kitajima et al.

[11] Patent Number: 5,790,290
[45] Date of Patent: Aug. 4, 1998

[54] OPTICAL DISTRIBUTION SYSTEM HAVING TIME SWITCH

[75] Inventors: Shigeki Kitajima; Toshio Kirihara, both of Kokubunji, Japan

[73] Assignee: Hitachi, Ltd., Tokyo, Japan

[21] Appl. No.: 905,570

[22] Filed: Aug. 4, 1997

Related U.S. Application Data

[60] Continuation of Ser. No. 685,730, Jul. 25, 1996, abandoned, which is a division of Ser. No. 209,751, Mar. 9, 1994, Pat. No. 5,576,872.

[30] Foreign Application Priority Data

Mar. 9, 1993 [JP] Japan .................................. 5-047729

[51] Int. Cl.$^6$ .................................................. H04J 14/08
[52] U.S. Cl. .............................. 359/139; 385/16; 348/6; 370/390; 370/432; 340/825.03; 455/3.1
[58] Field of Search ................................ 359/123, 139, 359/117, 128; 385/16–17, 24; 370/375, 390, 378–379, 380, 432; 348/6–7, 12–13; 340/825.03, 825.04, 825.79, 825.83; 455/3.1

[56] References Cited

U.S. PATENT DOCUMENTS

| | | | |
|---|---|---|---|
| 4,973,956 | 11/1990 | Lin et al. | 340/825.79 |
| 5,044,745 | 9/1991 | Inoue | 385/16 |
| 5,276,425 | 1/1994 | Swanson et al. | 370/390 |
| 5,365,519 | 11/1994 | Kozaki et al. | 370/390 |

FOREIGN PATENT DOCUMENTS

| | | |
|---|---|---|
| 0 446 437 | 9/1991 | European Pat. Off. . |
| 2 429 445 | 1/1980 | France . |
| 0 097 752 | 7/1980 | Japan . |
| 61-91623 | 5/1986 | Japan . |
| 2 093 304 | 8/1982 | United Kingdom . |
| 2 156 178 | 10/1985 | United Kingdom . |

OTHER PUBLICATIONS

Transactions of the Institute of Electronics, Information and Communication Engineers of Japan, vol. E75-B, No. 4, Apr. 1992, Tokyo, JP, pp. 235–242, S. Suzuki et al.: Trend of Photonic Switching Systems.

S. Suzuki et al. "Photonic Space Division Switching System fFor Broadband Services" Proceedings International Switching Symposium, May 28–Jun. 1, 1990, vol. 1, pp. 153–158.

Minoru Akiyama, et al., "Digital Telephone Exchange" (1986), Journal of Lightwave Technology, vol. 9, No. 7 (1991) pp. 871–877.

Journal of Selected Areas in Communications, No. 7 (1988), pp. 1248–1254.

*Primary Examiner*—Kinfe-Michael Negash
*Attorney, Agent, or Firm*—Kenyon & Kenyon

[57] ABSTRACT

Optical paths to propagate a plurality of optical information signals intersect optical paths to transmit light signals to a plurality of subscribers. Light power dividing and propagation direction changing devices for separating requested optical information signals are arranged at the intersecting points. Losses of the optical information signals, due to the separation, are compensated by optical amplification, so that the signals can be distributed to all of the subscribers while maintaining a predetermined intensity. Thus, the same photosignal can be distributed to a plurality of subscribers. The system can be easily expanded in correspondence to an increase in the number of optical information signals and an increase in the number of subscribers.

2 Claims, 19 Drawing Sheets

F I G. 14
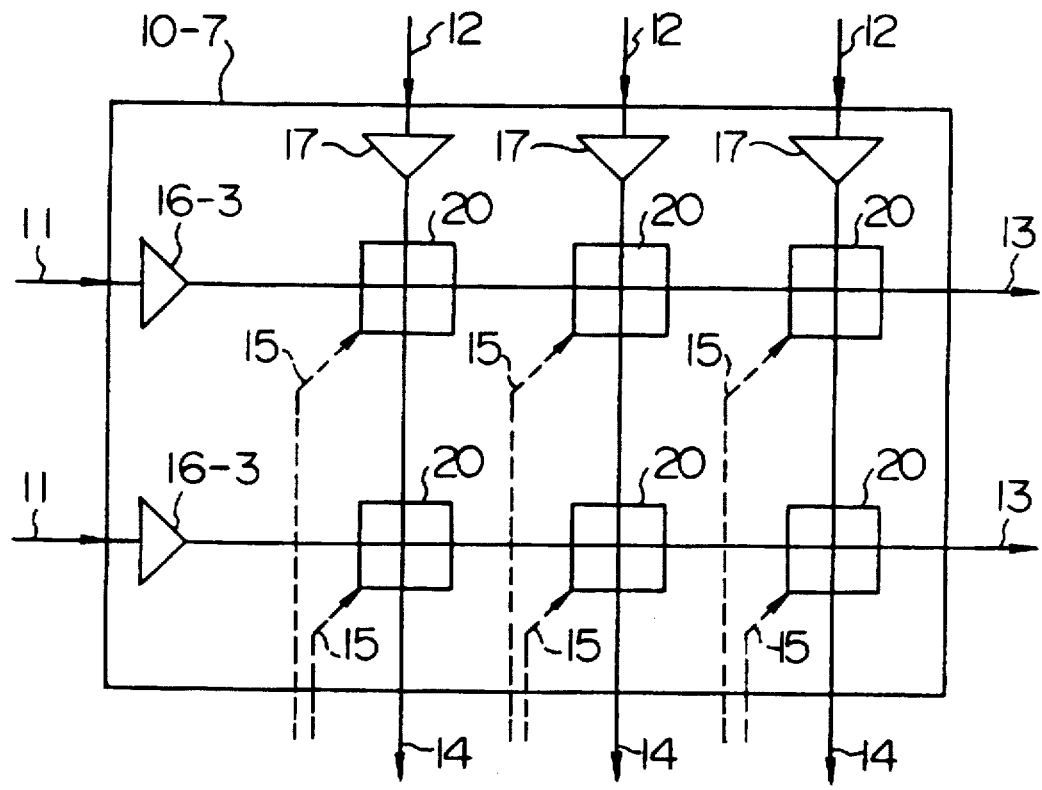

F I G. 16
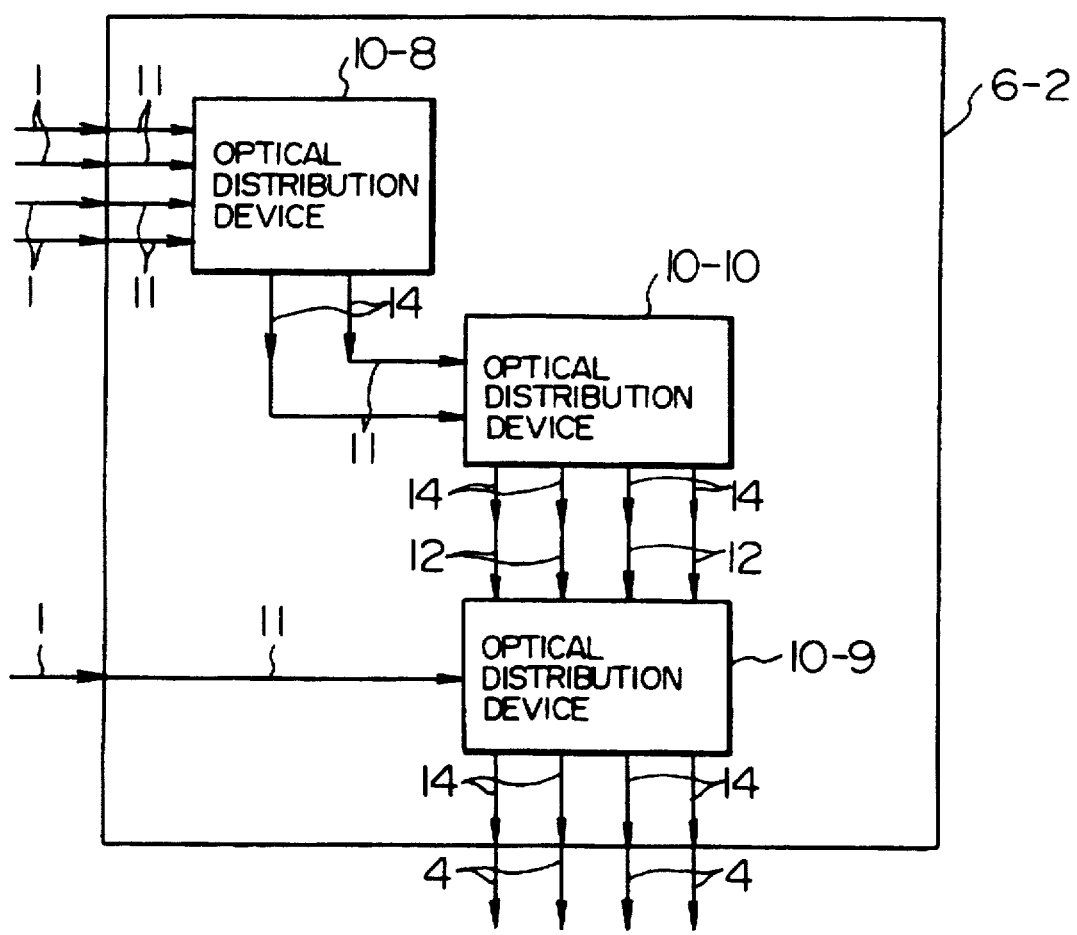

F I G. 17
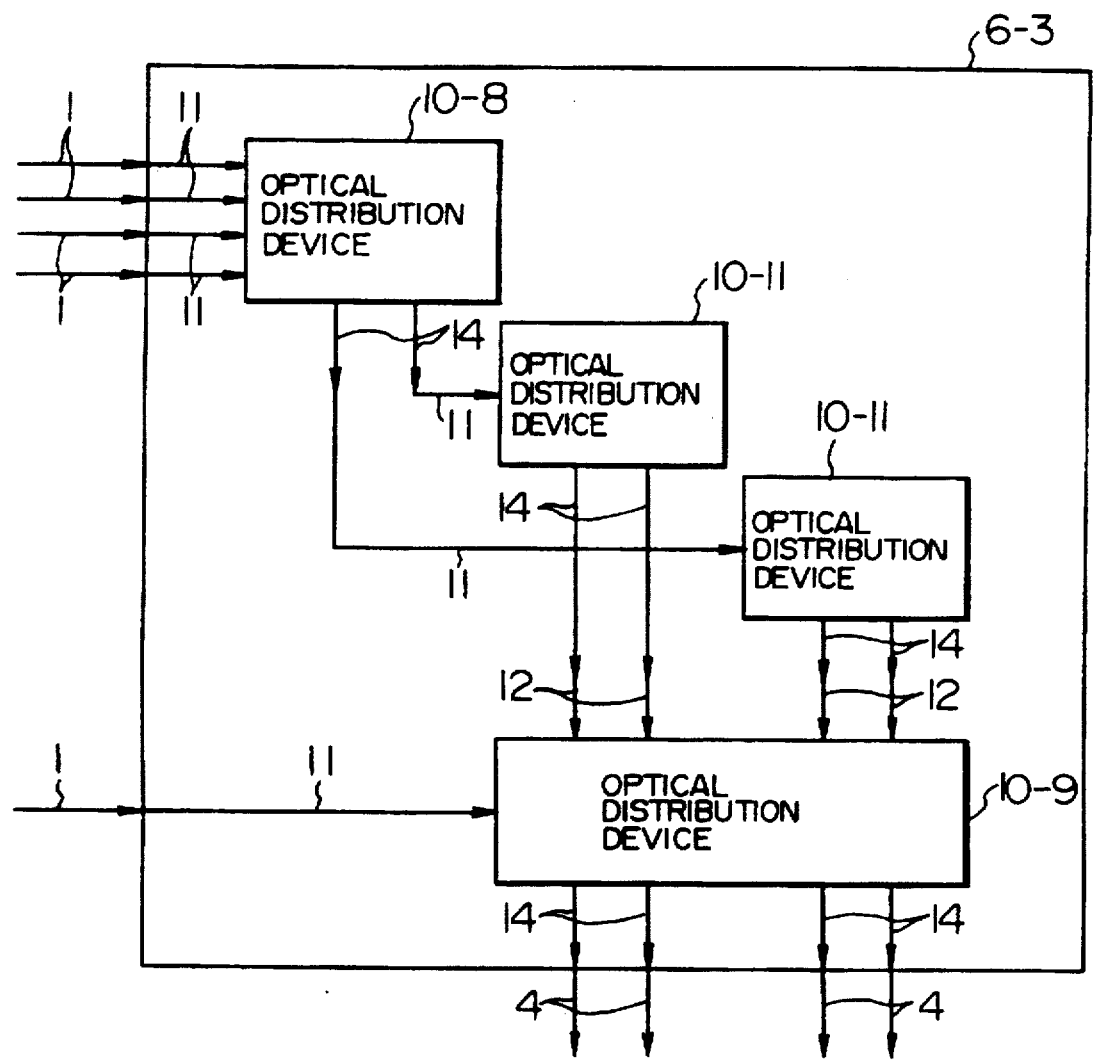

F I G. 18
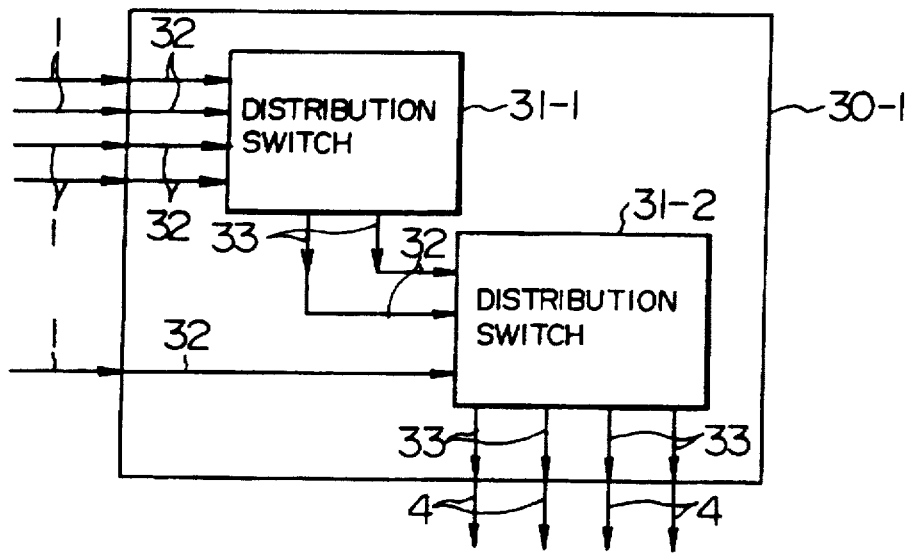
F I G. 19
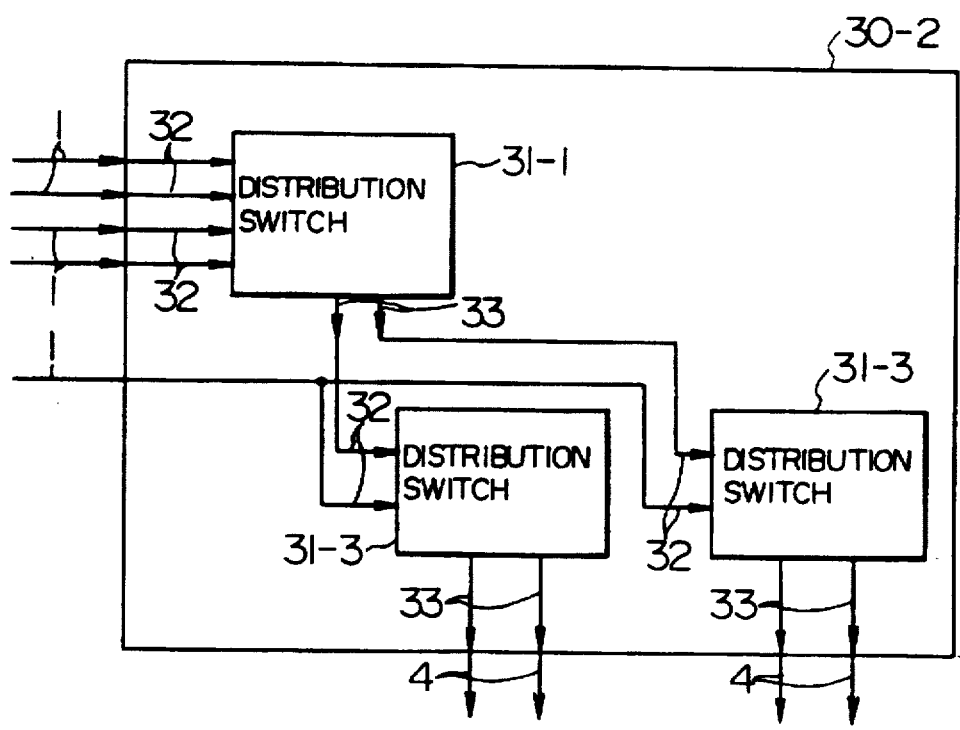

F I G. 23
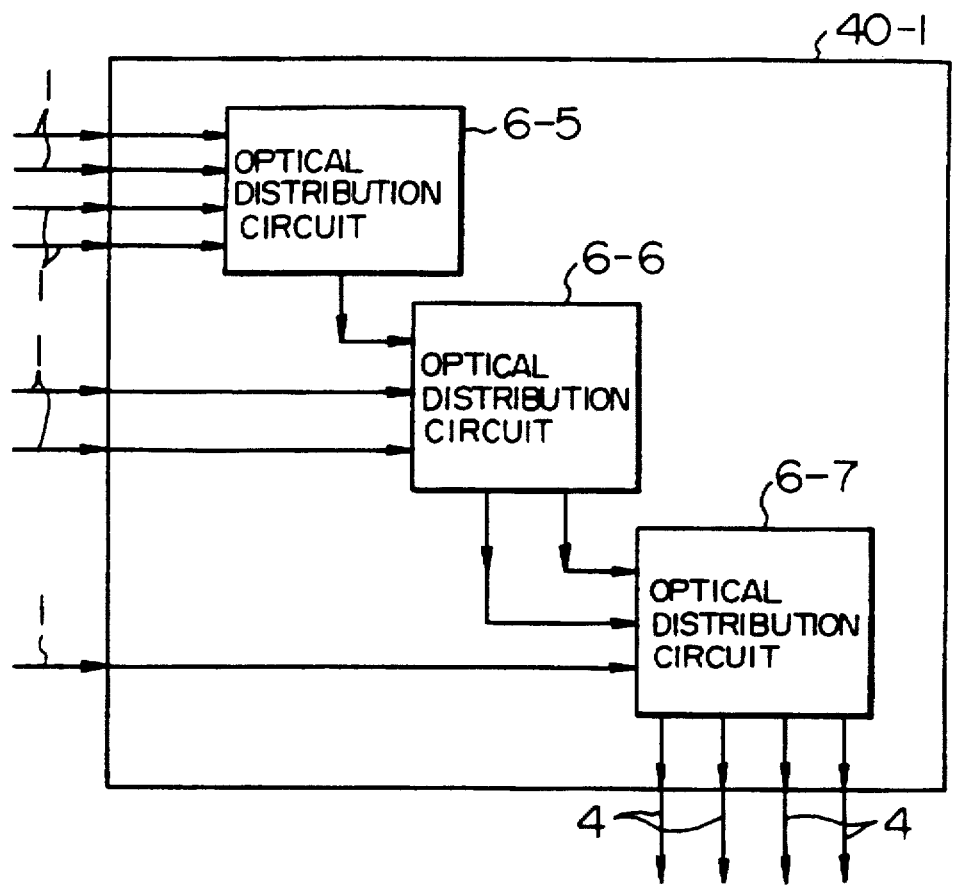

F I G. 24
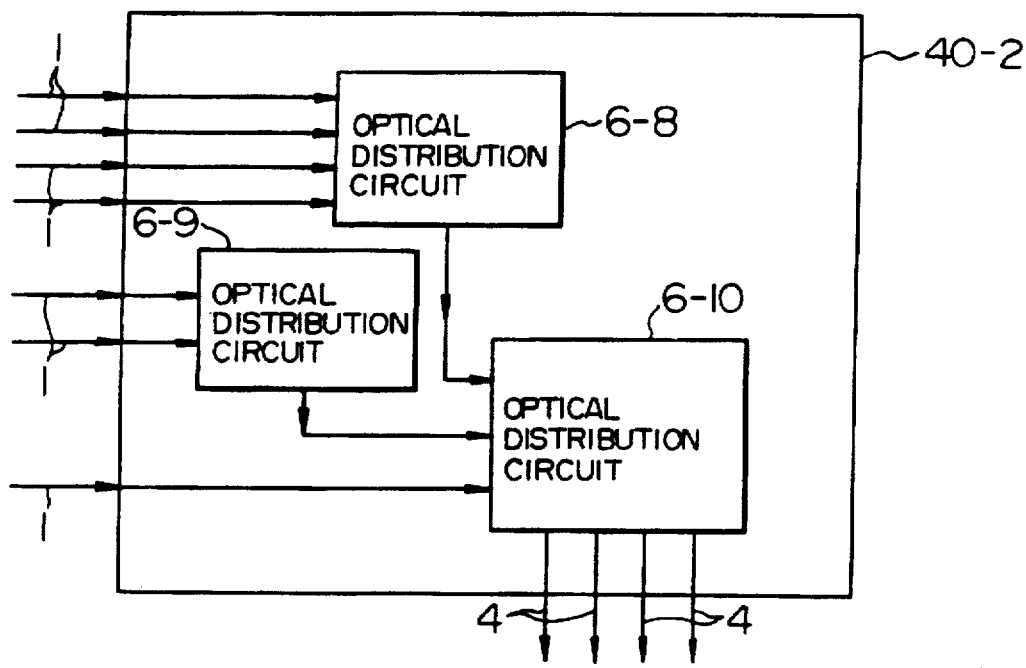
F I G. 25
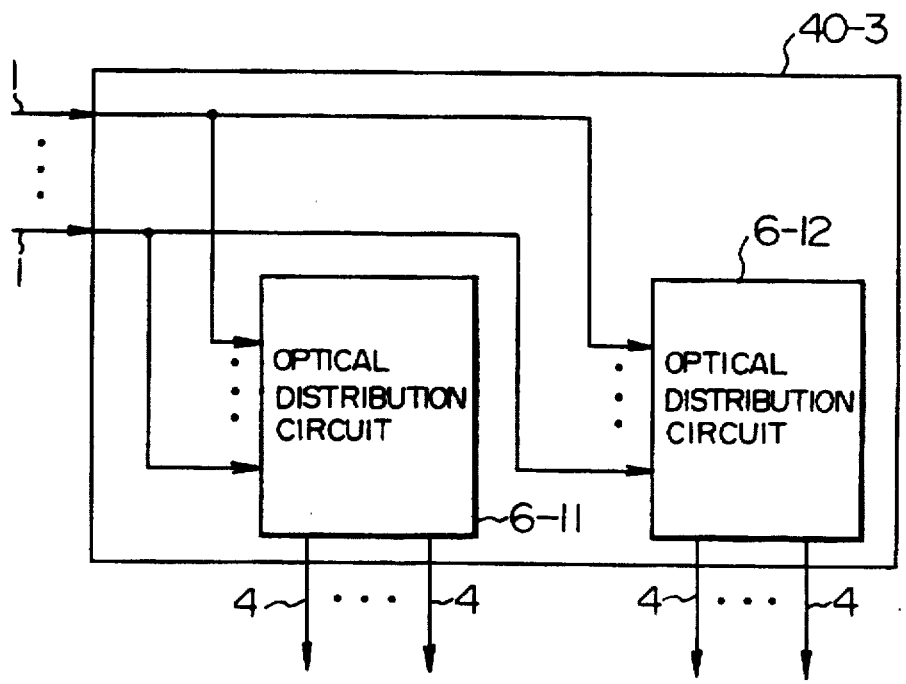

F I G. 31
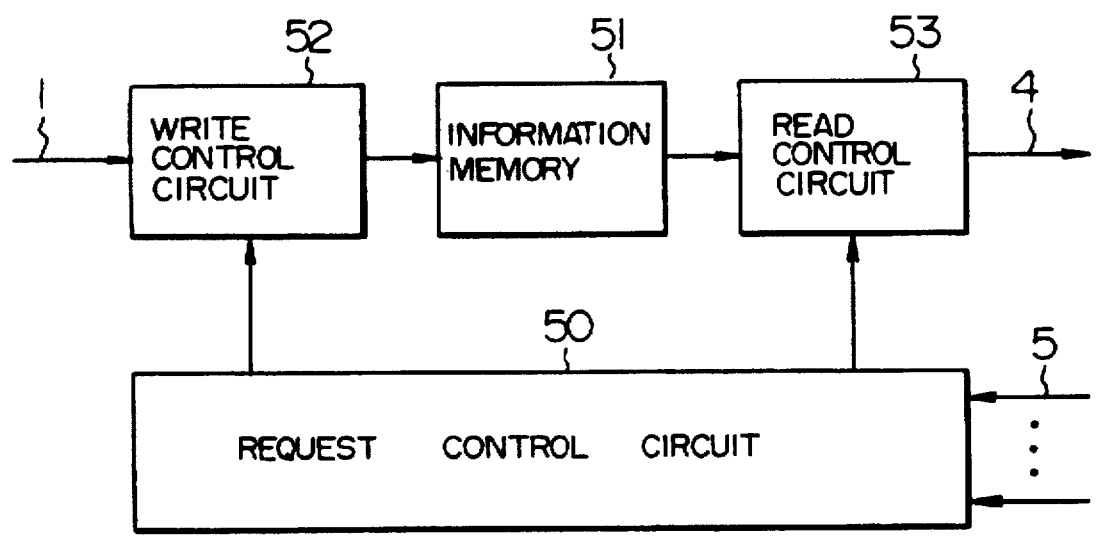

OPTICAL DISTRIBUTION SYSTEM HAVING TIME SWITCH

This application is a continuation of application Ser. No. 08/685,730 filed 25, Jul. 1996, now abandoned, which is a division of application Ser. No. 08/209,751 filed 9, Mar. 1994, now Pat. Ser. No. 5,576,872.

BACKGROUND OF THE INVENTION

The present invention relates to an optical device which is used in an optical fiber communication system and, more particularly, to an optical device which is suitable for an information distribution optical network represented by a cable television and to a synthesizing method of such an optical device.

Communication networks have been supported so far by electronic circuits techniques (reference literature: Minoru Akiyama, et al., "Digital Telephone Exchange", Sangyo Tosho Co., Ltd., published in 1986). In recent years, the development of optical fiber communication system which can transmit information to a long distance at a high speed is remarkable and the realization of such optical communication systems is progressing.

Among such systems information distribution type optical networks are advancing in such a direction as to distribute a larger amount of information to a larger number of terminals. In the case of optical cable television as an example, there is a tendency to increase the number of channels and the number of subscribers increase. When the number of channels increases, it is necessary to widen a range of the signal selection. According to a method of selecting the channel in a receiver which the subscriber possesses, it is difficult to cope with an increase in number of channels. It is, therefore, necessary to use a method whereby, on the side which serves information, the channel selection is controlled and only the necessary signal is distributed to the subscriber in accordance with a request from the subscriber. A construction to realize such a method by present existing devices is as shown in FIG. 2. Signals 1—1 to 1-m of respective channels are distributed to selectors 3-1 to 3-n corresponding to subscribers (1 to n) by optical amplifying distributors 2-1 to 2-m. Distribution signals 4-1 to 4-n selected by the selectors 3-1 to 3-n in accordance with request signals 5-1 to 5-n are sent to the subscribers.

Each of the optical amplifying distributors 2-1 to 2-m can be realized by a combination of an optical amplifier and a photocoupler. As a selector of a photosignal, it is possible to apply an optical switch as described in the literature, "Journal of Lightwave Technology", Vol. 9, No. 7, pages 871–877, 1991.

According to the above conventional method, since an increase in number of subscribers or an increase in number of channels causes an increase in number of amplification distributions or an increase in number of channels which can be selected, there is a problem such that the scales of the photocoupler for separation and the optical switch and their connecting wires increase. Since the signals of the channels which are not selected are also amplified, there is also a problem such that an unnecessary electric power is consumed. There is further a problem such that it is necessary to exchange the optical switch to another optical switch having a larger number of inputs in association with an increase in number of channels and there is a problem of an expandability. According to the above conventional method, on the other hand, since it is necessary to use the amplification distribution and optical transmission path for the channel which is hardly selected, there is a problem such that a whole scale increases due to the parts which are hardly used.

Another conventional technique is entitled "Optical Switch Element" disclosed in JP-A-61-91623. Such a technique relates to a method of loss modulating each signal after the signals are distributed toward all of the output terminals, so that there is a problem such that the signal which is not selected is abandoned. For instance, since a separation loss occurs at every optical switch, even if the light intensity is compensated by amplification, when the number of distributions increases, the S/N ratio deteriorates. Since the unnecessary signals are also distributed, an intensity which is distributed to the signal to be selected decreases and a total amplification amount and an electric power consumption increase. A further conventional technique is shown in Kishimoto et al., "Optical Self-Routing Switch Using Integrated Laser Diode Optical Switch", IEEE Journal on selected areas in communication, Vol. 6, No. 7, August, 1988.

SUMMARY OF THE INVENTION

It is an object of the invention to reduce a scale of an optical distribution circuit by realizing both the separation and selection of photosignals by one optical device.

Another object of the invention is to suppress an electric power consumption by performing optical amplification according to the number of subscribers selected.

Still another object of the invention is to provide an optical distribution circuit which can be easily expanded by merely adding new parts in correspondence to an increase in the number of channels.

Further another object of the invention is to provide a synthesizing method which can reduce a scale of an optical distribution circuit in consideration of the probability of each channel being selected.

The above objects of the invention are accomplished by an optical distribution circuit in which optical distribution devices, each comprising two optical paths, a light power dividing and propagation direction changing device which connects those optical paths, and an optical amplifying unit are matrix connected in a manner such that the two optical paths correspond to rows and columns, respectively.

Other objects of the invention are accomplished by an optical distribution circuit which is constructed by an optical circuit in which the above optical distribution devices are connected to a (m1×n1) matrix, a (n1×n2) matrix, and a (m2×n2) matrix, wherein (n1) optical outputs of the (m1×n1) matrix optical circuit are connected to (n1) optical inputs of the (n1×n2) matrix optical circuit and (n2) optical outputs of the (n1×n2) matrix optical circuit are connected to (n2) optical inputs of the (m2×n2) matrix optical circuit.

According to the invention, the signal of each channel is inputted to the optical path corresponding to each row and the signal of the selected channel is outputted from the optical path of each column corresponding to the subscriber. In accordance with a request of each subscriber, the light power dividing and propagation direction changing device separates the signal of the channel to the optical path corresponding to the subscriber. The optical amplifying section functions so as to compensate a loss of signal intensity which was caused by the signal separation.

According to the present invention, therefore, since both the separation and selection of the signal can be realized by one light power dividing and propagation direction changing device, the scale can be reduced.

Since the signal is amplified so as to compensate only the loss which was caused by the separation or propagation and the signal of the channel which is not selected is not amplified, the electric power consumption can be suppressed.

Further, by constructing the optical distribution circuit in a matrix form, it is possible to expand in correspondence to an increase in number of channels, an increase in number of subscribers, the row and column. Thus, the expansion can be easily performed by using the existing apparatus.

According to the optical distribution circuit comprising the (m1×n1) matrix optical circuit, (n1×n2) matrix optical circuit, and (m2×n2) matrix optical circuit, (m1) channels and (m2) channels can be distributed to (n2) subscribers. The (m2×n2) matrix optical circuit enables all of the (n2) subscribers to request the (m2) channels which are frequently requested. The (n1×n2) matrix optical circuit narrows down the number of subscribers who select the (m1) channels such that the total number of channels which are requested is equal to a small number of (n1) or less from (n2) to (n1) or less (n1<n2). The (m1×n1) matrix optical circuit enables the narrowed-down (n1 or less) subscribers to select the (m1) channels.

According to the present invention, the distribution of (m1) channels which need the (m1×n2) matrix in the fundamental construction can be realized by a (m1×n1) matrix optical circuit and a (n1×n2) matrix optical circuit, and thus, the scale can be reduced.

BRIEF DESCRIPTION OF THE DRAWINGS

FIG. 14 is a constructional diagram of an optical distribution device having an optical amplifying section according to the invention;

FIG. 16 is a constructional diagram of an optical distribution circuit according to the invention;

FIG. 17 is a constructional diagram of an optical distribution circuit according to the invention;

FIG. 18 is a constructional diagram of a signal distributor according to the invention;

FIG. 19 is a constructional diagram of a signal distributor according to the invention;

FIG. 23 is a constructional diagram of a composite optical distribution circuit according to the invention;

FIG. 24 is a constructional diagram of a composite optical distribution circuit according to the invention;

FIG. 25 is a constructional diagram of a composite optical distribution circuit according to the invention;

FIG. 31 is a constructional diagram of a time switch according to the invention.

DESCRIPTION OF THE PREFERRED EMBODIMENTS

Figure 1:
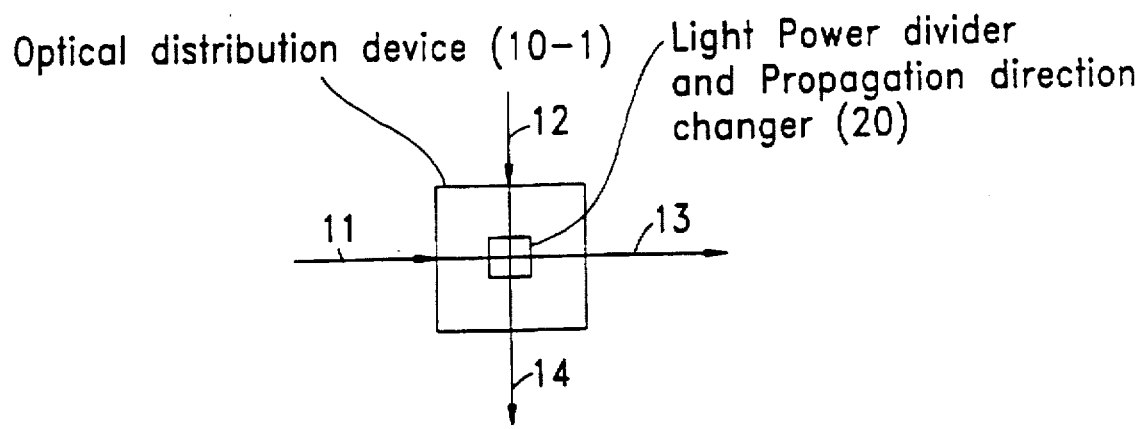
FIG. 1 is a fundamental constructional diagram of an optical distribution device according to the present invention.

As a first embodiment according to the present invention, FIG. 1 shows a fundamental construction of an optical distribution device. An optical distribution device 10-1 comprises: a first optical path having an optical input 11 and an optical output 13; a second optical path having an optical input 12 and an optical output 14; and light power dividing and propagation direction changing means 20 arranged at an intersecting portion of the first and second optical paths. The light power dividing and propagation direction changing means 20 operates in two modes of non-separation/separation.

In the non-separation mode, a photosignal of the optical input 11 is outputted to only the optical output 13 and is not outputted to the optical output 14. Similarly, a photosignal from the optical input 12 is outputted to only the optical output 14 and is not outputted to the optical output 13. In the separation mode, on the other hand, the photosignal from the optical input 11 is outputted to the optical output 13 and a part of the photosignal is separated and is also outputted from the optical output 14. The photosignal from the optical input 12 in the separation mode, on the other hand, is not outputted to the optical output 13. In a system which is set into the separation mode only when the photosignal is not inputted from the optical input 12, however, the system can be also set into a state in which the photosignal which propagates in the optical input 12 can be separated to the optical output 13. The output of the photosignal from the optical input 12 to the optical output 14 in the separation mode operates in different manners in dependence on the system which is used and there is a case where such a photosignal is outputted and a case where it is not outputted.

Figure 3:
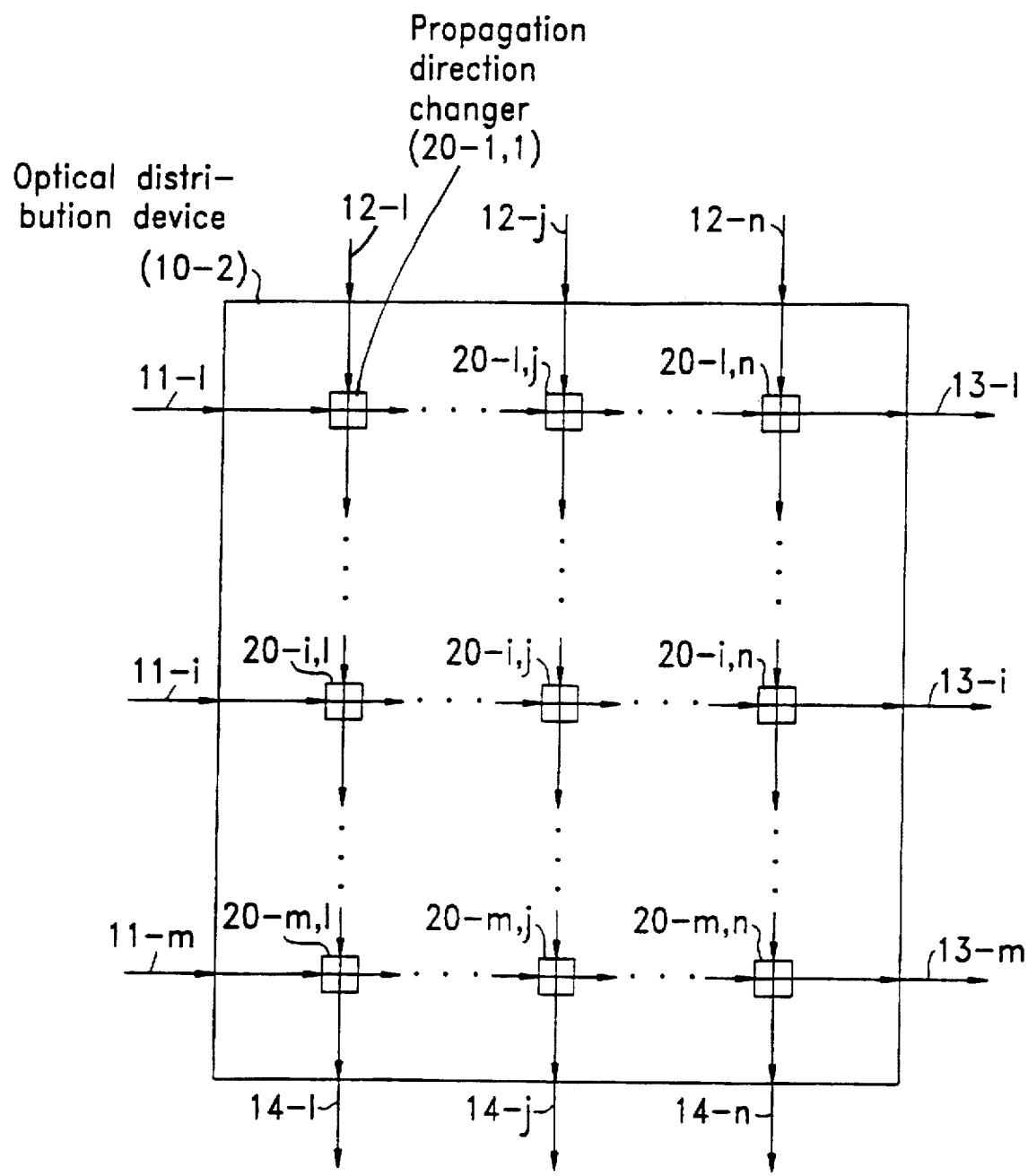
FIG. 3 is a constructional diagram of optical distribution devices according to the invention.

FIG. 3 shows a fundamental construction of an optical distribution device 10-2 according to the embodiment which is arranged in a (m×n) matrix form. The optical distribution device 10 comprises: (m) first optical paths; (n) second optical paths; and (m×n) light power dividing and propagation direction changing means 20 arranged at intersections of the first and second optical paths. The (m) first optical paths have optical inputs 11-1 to 11-m and optical outputs 13-1 to 13-m. The (n) second optical paths have optical inputs 12-1 to 12-n and optical outputs 14-1 to 14-n.

Each light power dividing and propagation direction changing means 20 operates in the two modes of non-separation/separation. In the non-separation mode, the photosignal which was propagated in the first optical path is outputted to only the first optical path and the photosignal which was propagated in the second optical path is outputted to only the second optical path. In the separation mode, on the other hand, the photosignal which was propagated in the first optical path is outputted to the first optical path and a part of the photosignal is separated and is also outputted to the second optical path. The photosignal which was propagated in the second optical path in the separation mode is not outputted to the first optical path. However, in a system which is set into the separation mode only when the photosignal is not propagated from the second optical path, the system can be also set into a state in which the photosignal which was propagated through the second optical path can be separated by the first optical path. As for the output to the second optical path of the photosignal from the second optical path to the second optical path in the separation mode, since a different operation is executed in dependence on a system which is used, there is a case where the photosignal is outputted and a case where it is not outputted.

The photosignal distributing operation of the optical distribution device 10-2 will now be described with respect to the case of distributing the photosignal from the optical input 11-i to the optical output 14-j as an example. Among light power dividing and propagation direction changing means (20-i, j to 20-m, j) of the j-th column and light power dividing and propagation direction changing means (20-i, 1 to 20-i, n) of the i-th row, the light power dividing and propagation direction changing means (20-i, j) operates in the separation mode and the other light power dividing and propagation direction changing means 20 of the i-th row operate in the non-separation mode. A photosignal from the optical input 11-i passes from the light power dividing and propagation direction changing means (20-i, 1) which operates in the non-separation mode or the separation mode through the light power dividing and propagation direction changing means (20-i, (j-1)) and propagates in the first optical path and reaches the light power dividing and propagation direction changing means (20-i, j). The photosignal is separated to the second optical path by the light power dividing and propagation direction changing means (20-i, j) which operates in the separation mode. The photosignal of the channel (i) which was separated passes from the light power dividing and propagation direction changing means (20-(i+1),j) which operates in the non-separation mode through the light power dividing and propagation direction changing means (20-m, j) and is outputted from the optical output 14-j.

In the first embodiment, since the signal to be selected is separated by the light power dividing and propagation direction changing means 20, both of the separation and the selection of the signal can be realized by one optical device. Therefore, the scale of the optical distribution circuit can be reduced.

Figure 4:
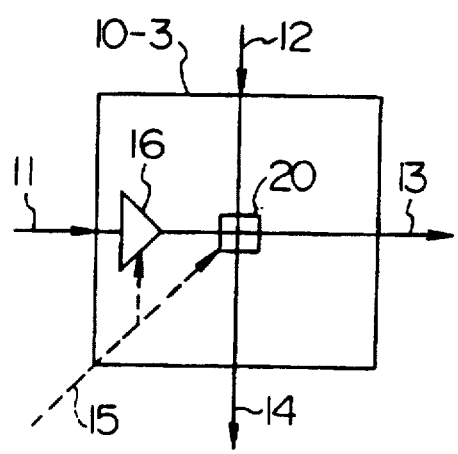
FIG. 4 is a constructional diagram of an optical distribution device having an optical amplifying section according to the invention.

FIG. 4 shows a construction of an optical distribution device 10-3 as a second embodiment according to the invention. The optical distribution device 10-3 comprises: a first optical path having the optical input 11, the optical output 13, and an optical amplifying section 16; a second optical path having the optical input 12 and the optical output 14; and the light power dividing and propagation direction changing means 20 arranged in the intersecting portion of the first and second optical paths. The light power dividing and propagation direction changing means 20 and the optical amplifying section 16 operate in the two modes of non-separation/separation in accordance with a control signal 15.

In the non-separation mode, the photosignal of the optical input 11 is not amplified by the optical amplifying section 16 but is outputted to only the optical output 13 by the light power dividing and propagation direction changing means 20 and is not outputted to the optical output 14. Similarly, the photosignal from the optical input 12 is outputted to only the optical output 14 and is not outputted to the optical output 13. In the separation mode, on the other hand, the photosignal from the optical input 11 is amplified by the optical amplifying section 16 and is outputted to the optical output 13 and a part of the photosignal is separated and is also outputted to the optical output 14. The output to the optical output 14 of the photosignal from the optical input 12 in the separation mode differs in dependence on the system in a manner similar to the case of the first embodiment.

In the second embodiment, the signal can be amplified in the optical amplifying section 16 so as to compensate for separation loss which is caused by separating the photosignal in the light power dividing and propagation direction changing means 20. Since there is no need to amplify the photosignal which is not separated, electric power consumption can be suppressed.

Figure 5:
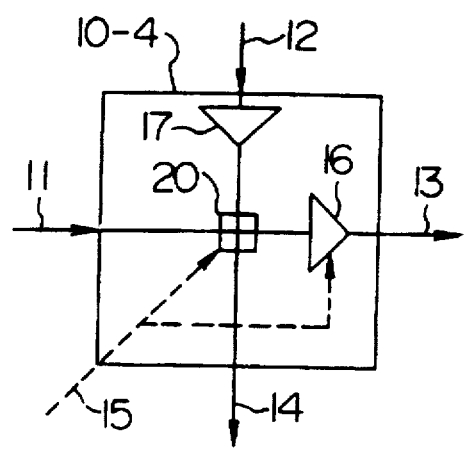
FIG. 5 is a constructional diagram of an optical distribution device having an optical amplifying section according to the invention.

FIG. 5 shows a construction of an optical distribution device 10-4 as a third embodiment according to the present invention. The optical distribution device 10-4 comprises: a first optical path having the optical input 11, optical output 13, and optical amplifying section 16; a second optical path having the optical input 12, optical output 14, and an optical amplifying section 17; and the light power dividing and propagation direction changing means 20 arranged in the intersecting portion of the first and second optical paths. The light power dividing and propagation direction changing means 20 and the optical amplifying section 16 operate in the two modes of non-separation/separation in accordance with the control signal 15.

In the non-separation mode, the photosignal of the optical input 11 is outputted to only the first optical path in the light power dividing and propagation direction changing means 20 and is amplified in the optical amplifying section 16 so as to compensate a propagation loss amount. The photosignal of the same intensity as that of the optical input 11 is outputted to the optical output 13 and is not outputted to the optical output 14. Similarly, the photosignal from the optical input 12 is amplified in the optical amplifying section 17 so as to compensate a propagation loss amount and is outputted to only the second optical path in the light power dividing and propagation direction changing means 20. The photosignal of the same intensity as that of the optical input 12 is outputted to the optical output 14 and is not outputted to the optical output 13. In the separation mode, on the other hand, the photosignal from the optical input 11 is amplified in the optical amplifying section 16, the photosignal of the same intensity as that of the optical input 11 is outputted to the optical output 13, and a part of the photosignal is separated and is also outputted to the optical output 14. The photosignal from the optical input 12 in the separation mode is amplified in the optical amplifying section 17 at a fixed amplification gain. However, the operation in the light power dividing and propagation direction changing means differs in dependence on the system in a manner similar to the case of the first embodiment.

In the third embodiment, the signal of the optical input 11 is outputted from the optical output 13 as a photosignal of the same intensity irrespective of the mode of non-separation/separation. Similarly, the signal of the optical input 12 is outputted from the optical output 14 as a photosignal of the same intensity.

Figure 6:
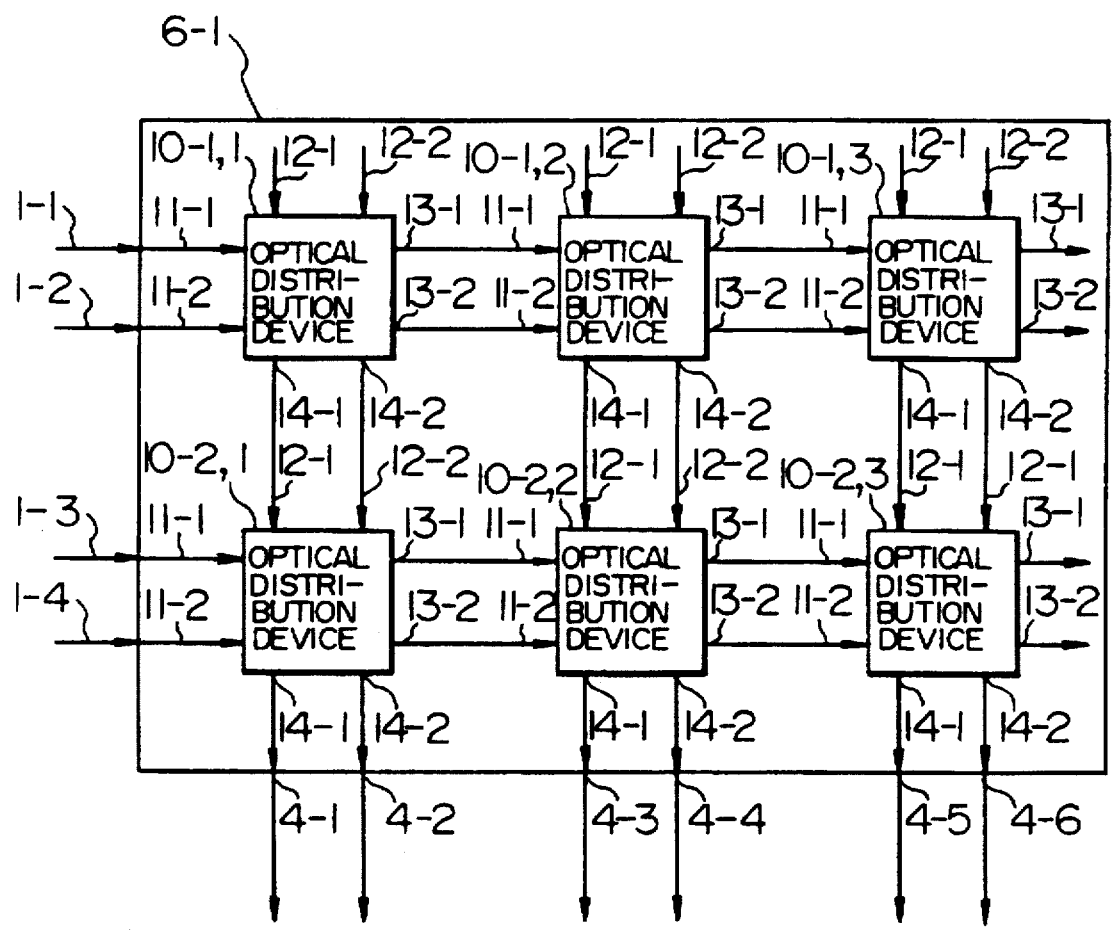
FIG. 6 is a constructional diagram of an optical distribution circuit according to the invention.

An embodiment of an optical distribution circuit 6-1 according to the invention will now be described. Optical distribution devices 10 of (m) rows (m≧1) and (n) columns (n≧1) are arranged to (k) rows (k≧1) and (h) columns (h≧1) and are connected, thereby forming the optical distribution circuit 6-1. FIG. 6 shows a construction of the optical distribution circuit in the case where n=m=k=2 and h=3. The information signals 1—1 to 1-4 which are inputted to the optical distribution circuit are inputted to the optical inputs 11 of the optical distribution devices (10-1.1) and (10-1.2) of the first column. The optical outputs 13 of the optical distribution devices of each column (first and second columns) are connected to the corresponding optical inputs 11 of the next columns (second and third columns). The optical output 13 of the last column (third column) is not connected. The optical input 12 of the first row is also not connected. The optical output 14 of each row (first row) is connected to the optical input 12 of the next row (second row). The optical output 14 of the last row (second row) is set to the optical outputs 4-1 to 4-6 to the subscribers. Thus, the optical distribution circuit of four inputs and six outputs can be constructed.

According to the embodiment, photosignals of an arbitrary four channels can be distributed to six subscribers. The photosignal of the same channel can be also distributed to a plurality of subscribers.

According to the embodiment, by increasing the value of (h), the number of channels can be increased and, by increasing the value of (k), the number of subscribers can be increased. By connecting the optical distribution device 10 to the optical input 12 of the first column which is not connected or to the optical output 13 of the last column (third column) which is not connected, the circuit scale can be easily expanded.

When expanding the scale of the optical distribution circuit 6, the propagation loss on the optical path and the separation loss in the light power dividing and propagation direction changing means 20 cause a limitation due to attenuation of the intensity of the photosignal. In the second embodiment of the invention, since the separation loss can be compensated, a limit of the scale expansion can be widened. In the third embodiment, when the optical distribution device 10-4 is connected in the matrix, the intensity of the photosignal which propagates in the first optical path is not attenuated due to the operation of the optical amplifying section 16. Similarly, the intensity of the photosignal which propagates in the second optical path is also not attenuated due to the operation of the optical amplifying section 17. Therefore, when the number of columns and the number of rows are increased, a limitation due to the losses by the separation or propagation on the first and second optical paths can be eliminated.

Figure 7:
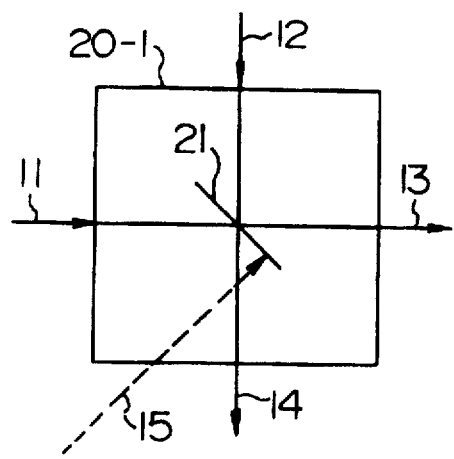
FIG. 7 is a fundamental constructional diagram of light power dividing and propagation direction changing means according to the invention.

A specific constructional example of the light power dividing and propagation direction changing means 20 will now be described. The most fundamental construction relates to a method of changing the propagation direction of the photosignal by using a partial reflecting mirror which can control a reflectance. FIG. 7 is a constructional diagram of a first light power dividing and propagation direction changing means 20-1. The means 20-1 comprises: a first optical path connecting the optical input 11 and the optical output 13; a second optical path connecting the optical input 12 and the optical output 14; and a variable partial reflecting mirror 21 which is arranged at an intersecting point of the first and second optical paths and is controlled by the control signal 15. In the non-separation mode, since the variable partial reflecting mirror 21 transmits the photosignal, the photosignals from the optical inputs 11 and 12 are outputted from the optical outputs 13 and 14, respectively. In the separation mode, since the variable partial reflecting mirror 21 partially reflects the photosignal, the photosignal from the optical input 11 is separated and outputted from the optical output 14. Since the variable partial reflecting mirror 21 partially reflects the photosignal, the photosignal from the optical input 12 is also outputted from the optical output 13.

According to the embodiment, a part of the photosignal which is inputted to the first optical path can be separated and taken out to the second optical path.

Figure 8:
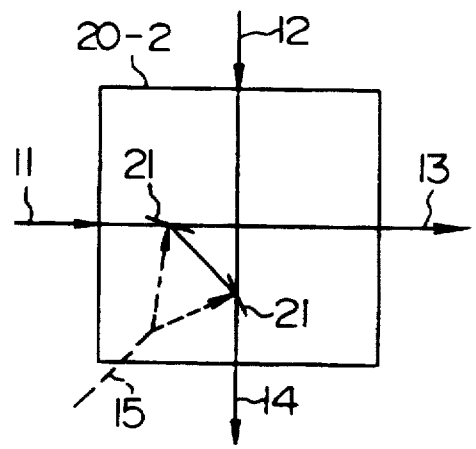
FIG. 8 is a constructional diagram of light power dividing and propagation direction changing means including a variable partial reflecting mirror according to the invention.

There is a method of connecting the first and second optical paths by a third optical path, thereby converting the propagation direction twice at two connecting points. FIG. 8 is a constructional diagram of a second light power dividing and propagation direction changing means 20-2.

Figure 2:
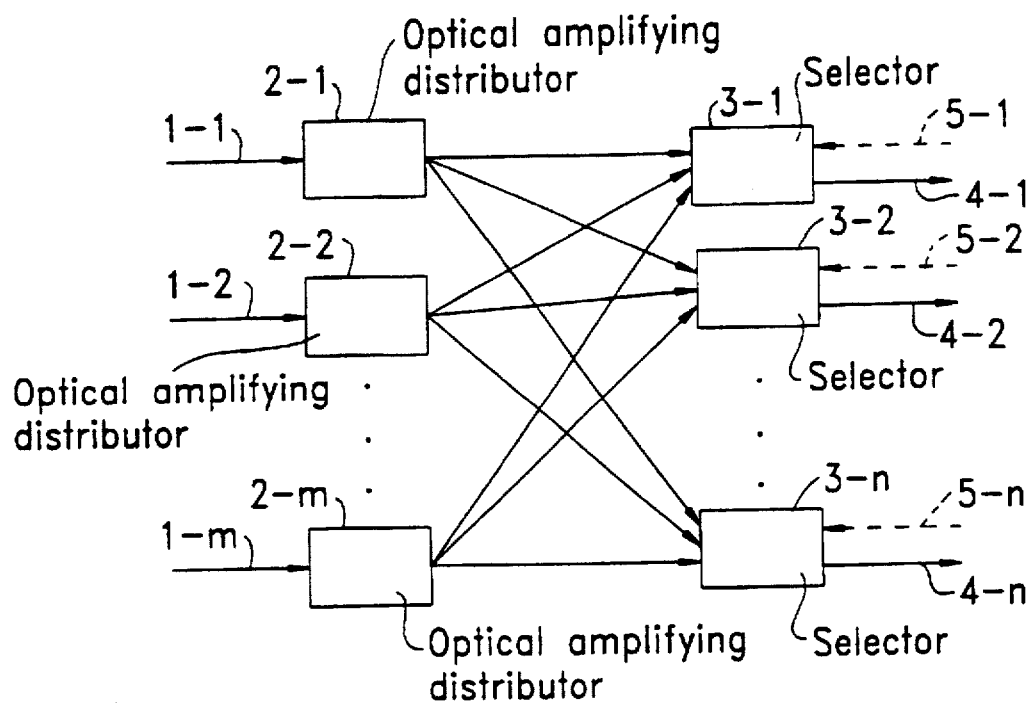
FIG. 2 is a constructional diagram of a optical distribution circuit according to a conventional technique.

The means 20-2 comprises: a first optical path connecting the optical input 11 and the optical output 13; a second optical path connecting the optical input 12 and the optical output 14; and a third optical path connected to the first and second optical paths. The variable partial reflecting mirror 21 which is controlled by the control signal 15 is arranged at each of the intersecting point of the first and third optical paths and the intersecting point of the third and second optical paths. In the non-separation mode, since the variable partial reflecting mirror 21 transmits the photosignal, the photosignals from the optical inputs 11 and 12 are outputted from the optical outputs 13 and 14, respectively. In the separation mode, since the variable partial reflecting mirror 21 partially reflects the photosignal, the photosignal from the optical input 11 is separated and is propagated in the third optical path and is again separated and is propagated in the second optical path and is outputted from the optical output 14. A part of the photosignal from the optical input 12 is transmitted and is outputted from the optical output 14 but is not outputted to the optical output 13. Such device can be realized by the same structure as that disclosed in, for example, FIGS. 2A to 2C in the U.S. Pat. No. 5,044,745, which is incorporated herein by reference.

By reflecting the photosignal twice as in the embodiment, the photosignal which is inputted to the second optical path is not separated to the first optical path. Consequently, the photosignal on the second optical path is not mixed with the photosignal on the first optical path.

By arranging the variable partial reflecting mirror 21 at the intersecting point of the third and second optical paths in the embodiment, a wavelength multiplex signal can be outputted from the optical output 14.

Figure 9:
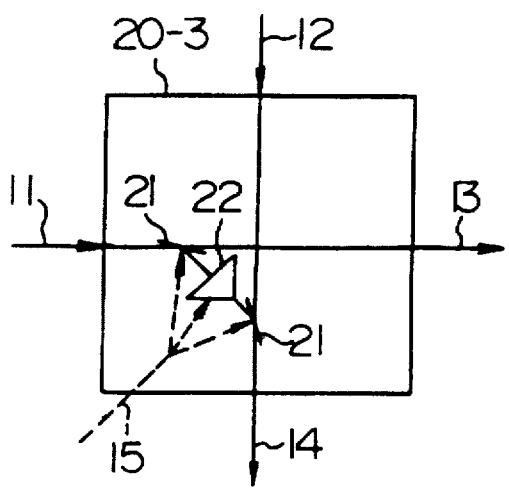
FIG. 9 is a constructional diagram of light power dividing and propagation direction changing means including an optical amplifying section according to the invention.

Further, by optically amplifying the separated signal, an S/N ratio of the separated photosignal can be improved. FIG. 9 is a constructional diagram of a third light power dividing and propagation direction changing means 20-3.

The embodiment has a construction in which an optical amplifying section 22 which is controlled by the control signal 15 is arranged on the third optical path of the second light power dividing and propagation direction changing means 20-2. In the non-separation mode, since the variable partial reflecting mirror 21 transmits the photosignal in a manner similar to the second light power dividing and propagation direction changing means 20-2, the photosignals from the optical inputs 11 and 12 are outputted from the optical outputs 13 and 14, respectively. In the separation mode, since the variable partial reflecting mirror 21 partially reflects the photosignal, the photosignal from the optical input 11 is separated and is propagated in the third optical path and is amplified in the optical amplifying section 22. The signal is separated in the next variable partial reflecting mirror 21 and is propagated in the second optical path and is outputted from the optical output 14. A part of the photosignal from the optical input 12 is transmitted and is outputted from the optical output 14 but is not outputted to the optical output 13. Such a device can be realized by the same structure as that disclosed in, for example, FIGS. 1A and 1B in U.S. Pat. No. 5,044,745.

By optically amplifying the photosignal just after the separation as in the embodiment, there is an effect such that a high S/N ratio of the separated output photosignal can be maintained. As a result, the minimum permission intensity of the separated photosignal can be decreased, so that there is an effect such that a reflectance of the variable partial reflecting mirror 21 can be reduced.

Figure 10:
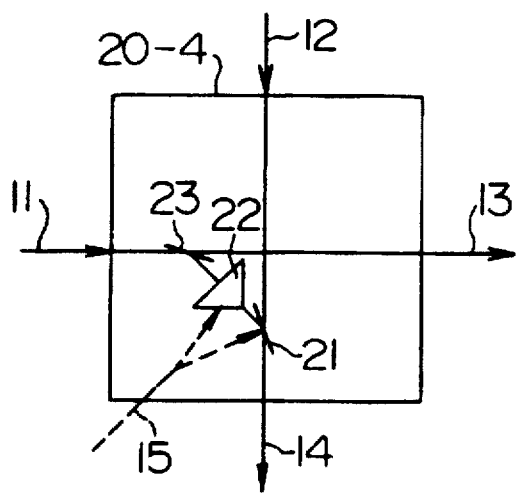
FIG. 10 is a constructional diagram of light power dividing and propagation direction changing means including a fixed portion reflecting mirror according to the invention.

Subsequently, the optical amplifying section 22 has a function to absorb and attenuate the photosignal in the non-separation mode. Even if the photosignal is separated and is propagated in the third optical path, it is not propagated to the second optical path in the non-separation mode. Therefore, the separation of the signal can be realized by using a fixed partial reflecting mirror. FIG. 10 is a constructional diagram of a fourth light power dividing and propagation direction changing means 20-4.

The embodiment has a structure in which the variable partial reflecting mirror 21 arranged at the intersecting point of the first and third optical paths of the third light power dividing and propagation direction changing means 20-3 is replaced by a fixed partial reflecting mirror 23. The photosignal from the optical input 12 is outputted to only the optical output 14 and is not outputted to the optical output 13 irrespective of the non-separation/separation mode in a manner similar to the second light power dividing and propagation direction changing means. In the non-separation mode, the photosignal from the optical input 11 is outputted to the optical output 13 and is also separated to the third optical path by the fixed partial reflecting mirror 23. Since the optical amplifying section 22 in the non-separation mode absorbs and attenuates the photosignal, the signal is not outputted to the optical output 14. In the separation mode, the photosignal is outputted to the optical output 13 by the fixed partial reflecting mirror 23 and is also separated to the third optical path. In the separation mode, since the optical amplifying section 22 amplifies the photosignal, the variable partial reflecting mirror 21 partially reflects the photosignal, so that the signal is again separated and is propagated in the second optical path and is outputted from the optical output 14.

By using a reflecting mirror having a fixed reflectance as in the embodiment, the intensity loss by the separation and propagation which is caused for a time interval until the photosignal from the optical input 11 is outputted from the optical output 13 is made constant irrespective of the non-separation/separation mode. This indicates that the optical amplifier of a fixed amplification gain can be used in the optical amplifying section to maintain the intensity of the photosignal which is propagated in the first optical path constant.

In the structure according to the embodiment in which the variable partial reflecting mirror 21 arranged at the intersecting point of the third and second optical paths of the fourth light power dividing and propagation direction 20-4 is replaced by the fixed partial reflecting mirror 23, the light intensity loss of the second optical path can be made constant.

Figure 11:
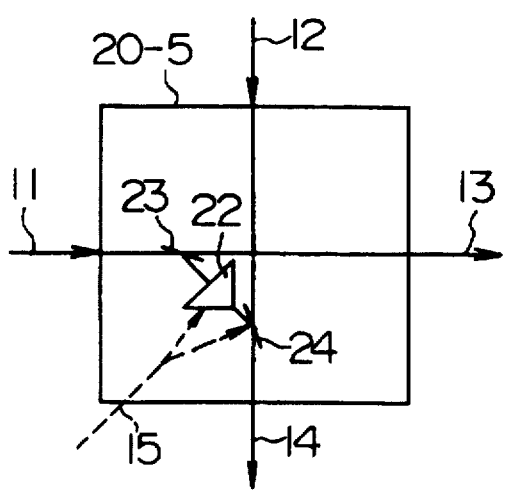
FIG. 11 is a constructional diagram of light power dividing and propagation direction changing means including a variable total reflecting mirror according to the invention.

Further, the variable partial reflecting mirror which is arranged at the intersecting point of the third and second optical paths can be replaced by a variable total reflecting mirror. FIG. 11 is a constructional diagram of a fifth light power dividing and propagation direction changing means 20-5.

The embodiment has a structure in which the variable partial reflecting mirror 21 arranged at the intersecting point of the third and second optical paths of the fourth light power dividing and propagation direction changing means 20-4 is replaced by a variable total reflecting mirror 24. In the operation in the non-separation mode, in a manner similar to the fourth light power dividing and propagation direction changing means 20-4, the photosignal from the optical input 11 is subjected to a predetermined loss and is outputted from the optical output 13 and the photosignal from the optical input 12 is transmitted through the variable total reflecting mirror 24 and is outputted from the optical output 14. In the separation mode, the photosignal from the optical input 11 is outputted to the optical output 13 and is separated to the third optical path by the fixed partial reflecting mirror 23. Since the optical amplifying section 22 in the separation mode amplifies the photosignal, the variable total reflecting mirror 24 totally reflects the photosignal, so that the signal is again separated and is propagated in the second optical path and is outputted from the optical output 14. On the other hand, the photosignal from the optical input 12 in the separation mode is totally reflected by the variable total reflecting mirror 24, so that it is not outputted to the optical output 14.

By arranging the variable total reflecting mirror at the intersecting point of the third and second optical paths as in the embodiment, the photosignal from the optical input 12 is not outputted to the optical output 14 in the separation mode. This indicates that the apparatus can have a function such that the signal on the downstream side on the second optical path (input signal of a large row number) can be preferentially outputted than the signal on the upstream side (input signal of a small row number).

Figure 12:
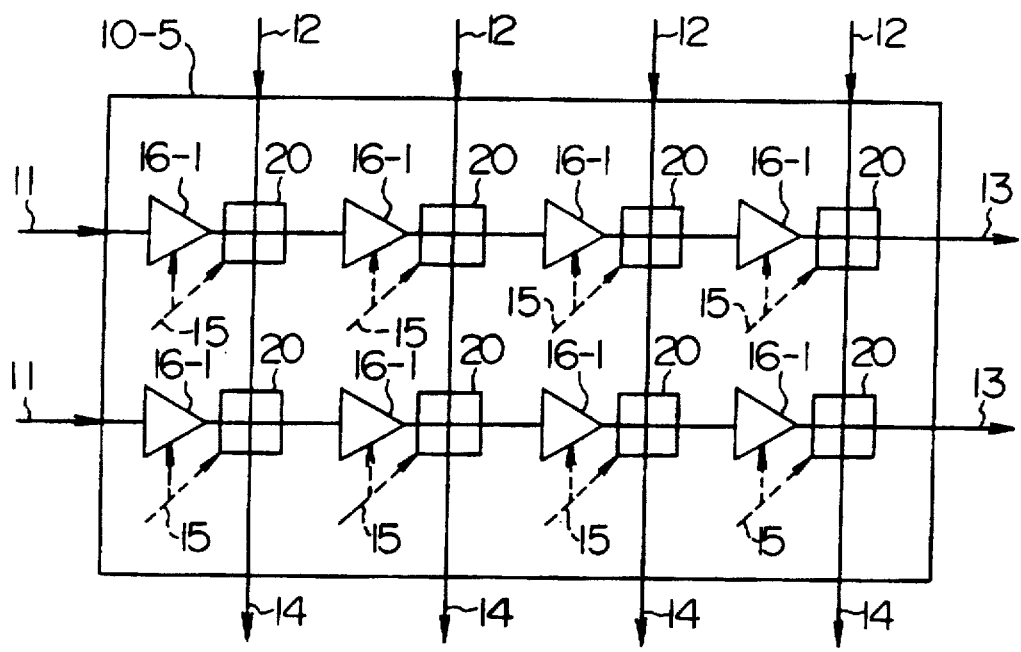
FIG. 12 is a constructional diagram of an optical distribution device having an optical amplifying section according to the invention.

A compensating method of the light intensity will now be described. An embodiment of an optical distribution device 10-5 shown in FIG. 12 has a construction in which an optical amplifying section 16-1 is arranged in correspondence to each light power dividing and propagation direction changing means 20. Each optical amplifying section 16-1 varies its amplification gain in accordance with the control signal 15, which controls the corresponding light power dividing and propagation direction changing means 20, thereby making the optical loss in each of the non-separation/separation modes constant. Although the optical amplifying section 16-1 has been arranged at the front stage of the light power dividing and propagation direction changing means 20 in FIG. 12, a similar effect is also obtained by arranging the optical amplifying section 16-1 at the post stage of the light power dividing and propagation direction changing means 20.

Figure 13:
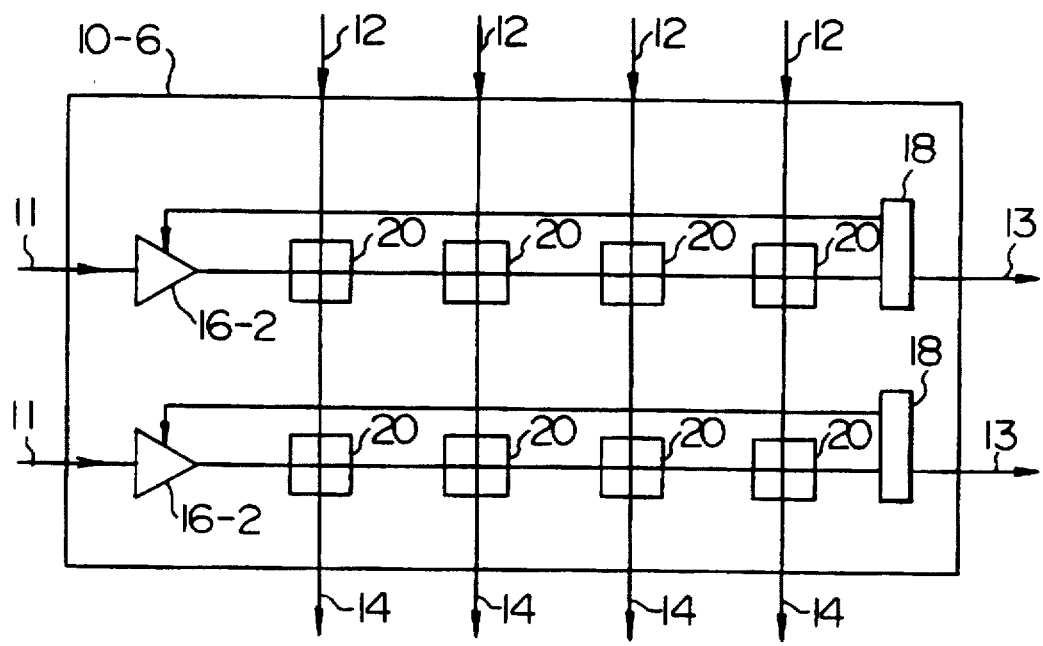
FIG. 13 is a constructional diagram of an optical distribution device having an optical amplifying section according to the invention.

An embodiment of an optical distribution device 10-6 shown in FIG. 13 has a construction in which a light intensity detecting section 18 is arranged just before the optical output 13 of each of the first optical paths and an optical amplifying section 16-2 is arranged just after the optical input 11 of each of the first optical paths. In order to make the light intensity, which is detected by the light intensity detecting section 18, constant, it is negatively fed back to an amplification gain of the optical amplifying section 16-2. Due to this, the number of optical amplifying sections can be reduced and an output light intensity can be stabilized without being influenced by a variation or fluctuation of separation loss characteristics of the light power dividing and propagation direction changing means 20. In FIG. 13, although the optical amplifying section 16-2 has been arranged just after the optical input 11, for example, by arranging the optical amplifying section 16-2 at a position on the first optical path and before the light intensity detecting section 18 like a position after the light power dividing and propagation direction changing means 20 of the last column and just before the light intensity detecting section 18, a similar effect is obtained.

An embodiment of an optical distribution device 10-7 shown in FIG. 14 relates to an embodiment using optical amplifying sections 16-3 and 17 each having a fixed amplification gain. As each light power dividing and propagation direction changing means 20, a light power dividing and propagation direction changing means 20 in which a separation ratio to separate the photosignal from the first optical path is not changed in accordance with the two non-separation and separation modes is used like a light power dividing and propagation direction changing means 20-4 shown in FIG. 10 or the light power dividing and propagation direction changing means 20-5 shown in FIG. 11. Since the total loss of the photosignal which is propagated in the first optical path is constant, a method of making the output light intensity almost coincide with the optical input intensity can be realized by optically amplifying with the optical amplifying section 16-3 at a predetermined amplification gain. In the embodiment, since the optical amplifying section 17 of the fixed amplification gain is also arranged on the second optical path, the loss of the photosignal which is propagated on the second optical path can be also compensated.

Both of the light power dividing and propagation direction changing means 20 and optical amplifying sections 16 and 17 in the invention can be realized by devices made of a semiconductor material. The variable partial reflecting mirror 21 and variable total reflecting mirror 24 can control reflectance characteristics by using a refractive index which is changed by a carrier implantation amount. Further, as a change in amplification gain of each of the optical amplifying sections 16 and 22 as well, a light amplification gain of an optical active portion can be controlled by controlling a carrier implantation amount.

Integration can be easily accomplished by using a semiconductor material.

The use of the partial reflection denotes that it is sufficient to set a required refractive index change amount to a value which is smaller than that in case of the total reflection, so that a driving electric power of the control signal can be reduced. Further, since a conversion angle in the propagation direction can be set to a large value, an angle which is formed by the first and second optical paths can be set to a large value. When the interval between the first and second optical paths is constant, the interval of the light power dividing and propagation direction changing means 20 is small, so that the device size can be also reduced.

Figure 15:
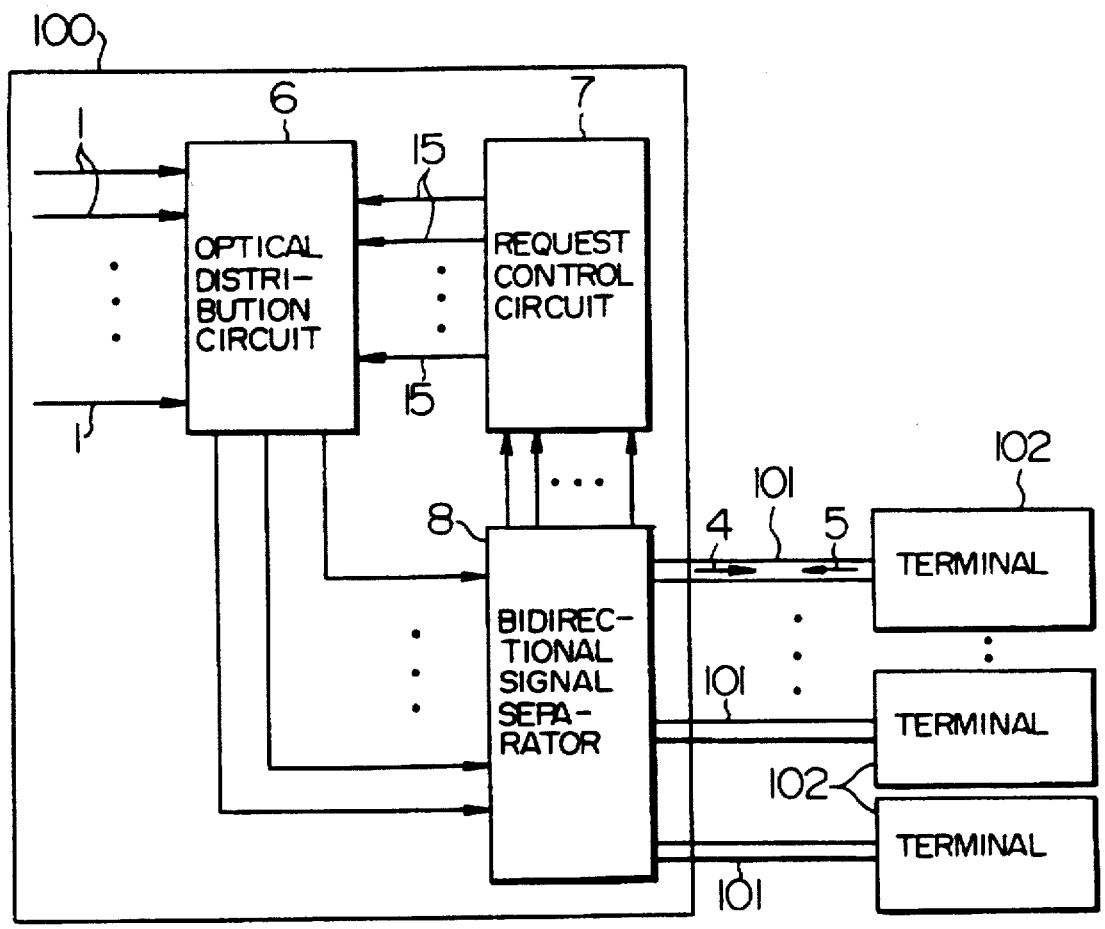
FIG. 15 is a constructional diagram of an optical cable television system.

The optical distribution circuit 10 of the present invention can be applied to an optical cable television system as shown in FIG. 15. A signal distribution station 100 distributes the photosignal requested from an information signal 1 of each channel as an optical distribution signal 4 by optical lines 101 in accordance with a request signal 5 which is transmitted from each terminal 102 for a subscriber via the optical line 101.

In the signal distribution station 100, the request signal 5 from the terminal 102 for a subscriber is sent to a request control circuit 7 by a bidirectional photosignal separator 8. The request control circuit 7 sends the control signal 15 to the optical distribution circuit 10 in accordance with the request signal 5. The photosignal which was requested from a plurality of light information signals 1 in accordance with the control signal 15 is outputted by the optical distribution circuit 10 as a distribution signal 4 of the light from the light output corresponding to the subscriber who requested it. The light distribution signal 4 passes through the bidirectional photosignal separator 8 and is outputted to the optical line 101. The subscriber receives the light distribution signal 4 which was transmitted via the optical line 101 by terminal 102 for the subscriber, and can watch and listen to the program of the channel which was requested.

Since the embodiment uses the optical distribution circuit 10 of the invention, the following effects are obtained. In the case where a plurality of subscribers requested the same channel, the light information signal 1 of the same channel can be distributed to the plurality of subscribers. In the case where the number of channels which provide services is increased, by arranging additional optical distribution circuits 10 in the column direction, the system can be easily expanded while using the conventional optical distribution circuit 10 as it is.

In an optical cable television system to which the invention is applied, when the number of channels which provide services and the number of subscribers increase, there is a problem such that in the case of using the optical distribution circuit having a structure of the matrix type switch as it is, its scale increases in proportion to both of the increased channels and subscribers. It is considered that an increase in number of channels results in an enlargement of a scale of the system. The system can also provide services to channels which are hardly selected. To construct a more efficient optical distribution circuit, there is considered a connecting method of the optical distribution circuit such that only the requested channel among a number of channels prepared is connected to the optical distribution circuit which can be selected by the subscriber.

A scale of an optical distribution circuit 6 can be suppressed to a small scale by combining an optical distribution device 10-8 which selects the signal from a number of channels and an optical distribution device 10-9 for distributing to the subscriber. FIG. 16 shows an embodiment regarding a synthesizing method of an optical distribution circuit 6-2 using one optical distribution device 10—10. Five information signals 1 are inputted to the optical inputs 11 of the optical distribution device 10-8 of the matrix type of (4×2) and to the optical input 11 of the optical distribution device 10-9 of the matrix type of (1×4). The signals from the optical outputs 14 of the optical distribution device 10-8 are inputted to the optical inputs 11 of the optical distribution device 10—10 of the matrix type of (2×4). Signals from the optical outputs 14 of the optical distribution device 10—10 are inputted to the optical inputs 12 of the optical distribution device 10-9. The signals from the optical outputs 14 of the optical distribution device 10-9 are outputted as distribution signals 4 of the light from the optical distribution circuit 6-2.

The information signal 1 which was inputted to the optical input 11 of the optical distribution device 10-9 is a signal which is frequently selected and the signal can be distributed to all of the subscribers. On the other hand, the four signals inputted to the optical distribution device 10-8 are not so frequently selected, so that three or more of those four information signals 1 are not simultaneously selected. In the optical distribution device 10-8, two signals which are outputted from the optical outputs 14 among the four signals inputted to the optical inputs 11 can be selected by the subscriber.

To distribute the five information signals 1 to the four distribution signals 4 by the matrix type optical distribution circuit, an optical distribution circuit of the matrix type of (5×4) is needed. However, such an optical distribution circuit is realized by combining optical distribution circuits of a small scale. Although the embodiment has been shown as a small scale such that the five information signals 1 are distributed to the four distribution signals 4, when the number of channels and the number of subscribers increases, the effect to reduce the scale becomes remarkable.

The effect to reduce the scale exists in the connection of the optical distribution devices 10-8 and 10—10. The details of such an effect will be finally described with reference to FIG. 30.

FIG. 17 shows an embodiment of an optical distribution circuit 6-3 which is constructed by further using a plurality of optical distribution circuits of a small scale. In a manner similar to the optical distribution circuit 6-2 shown in FIG. 16, the scale of the optical distribution circuit 6 can be suppressed to a small scale by combining the optical distribution device 10-8 which selects the signal from a number of channels and the optical distribution device 10-9 to distribute to the subscribers.

FIG. 17 shows the embodiment in which two optical distribution devices 10-11 of the (1×2) matrix type are used in place of the one optical distribution device 10—10 of the (2×4) matrix type used in FIG. 16. The information signals 1 are inputted to the optical inputs 11 of the optical distribution device 10-8 of the (4×2) matrix type and to the optical input 11 of the optical distribution device 10-9 of the (1×4) matrix type. Two signals from the optical outputs 14 of the optical distribution device 10-8 are inputted to the optical inputs 11 of the two optical distribution devices 10-11. The signals from two optical outputs 14 of each of the optical distribution devices 10-11 are inputted to four optical inputs 12 of the optical distribution device 10-9. Signals from the optical outputs 14 of the optical distribution device 10-9 are outputted as distribution signals 4 of the light from the optical distribution circuit 6-2.

In the embodiment, the information inputted to the optical distribution device 10-8 which is hardly selected can be selected by one of the subscribers of the first and second columns and by one of the subscribers of the third and fourth columns.

According to the embodiment, the connecting portion which is realized by the optical distribution device 10—10 of the (2×4) matrix type in the optical distribution circuit 6-2 shown in FIG. 16 is realized by the two optical distribution devices 10-11 of the (1×2) matrix type, so that the circuit scale can be further suppressed to a small scale. Although the embodiment has been shown as a small scale such that five information signals 1 are distributed to four distribution signals 4, when the number of channels and the number of subscribers are increased, the effect to reduce the scale becomes further remarkable. The number of optical distribution devices is not limited to 2 but the use of a further larger number of optical distribution devices also produces the effect of reducing the scale. Moreover, a plurality of optical distribution devices 10-11 can be also realized by using devices of a different scale so long as they satisfy a condition such that the total number of optical inputs 11 is larger than the number of optical outputs 14 from the device 10-8 and the total number of optical outputs 14 is larger than the number of optical inputs to the device 10-9.

The connecting method of suppressing an enlargement of the scale by combining the optical distribution devices 10 can be also applied to the conventional distribution switch. In the general distribution switch, however, the inputs and outputs corresponding to the optical inputs 12 and optical outputs 13 in the optical distribution devices 10 cannot be always used. Therefore, it is necessary to partially change the construction as follows. In the case of using the optical input 12, the connecting portion with the optical output 14 of the optical distribution device 10 of the preceding row is integrated. In the case of using the optical output 13, the signal which is inputted is previously separated and distributed to the input of each distribution switch. FIGS. 18 and 19 show embodiments of a signal distribution circuit 30 using general distribution switches corresponding to the optical distribution circuits 6 in FIGS. 16 and 17.

A signal distribution circuit 30-1 shown in FIG. 18 comprises: a distribution switch 31-1 having four information signal inputs 32 and two distribution signal outputs 33; and a distribution switch 31-2 having three information signal inputs 32 and four distribution signal outputs 33. Four of the five information signals 1 are inputted to the four information signal inputs 32 of the distribution switch 31-1. The remaining one information signal 1 and outputs from the two distribution signal outputs 33 of the distribution switch 31-1 are inputted to the three information signal inputs 32 of the distribution switch 31-2. The outputs from the four distribution signal outputs 33 of the distribution switch 31-2 are outputted as four distribution signals 4 from the signal distribution circuit 30.

In the embodiment, the information signal 1 which is directly inputted to the distribution switch 31-2 which is frequently selected can be always distributed to an arbitrary subscriber. The signal distribution circuit 30 can select an arbitrary two of the four information signals 1 which are inputted to the distribution switch 31-1 which is hardly selected and can distribute the selected two signals 1 to arbitrary subscribers.

In order to distribute the five information signals 1 to the four distribution signals 4 by the matrix type switch, a switch of the (5×4) matrix type is needed. However, such a switch is realized by combining switches of a small scale. Although the embodiment has been shown as a small scale such that the signals are distributed to the four distribution signals 4, when the number of channels and the number of subscribers increase, the effect to reduce the scale becomes remarkable.

Further, FIG. 19 shows an embodiment which can be realized by using two distribution switches 31-3 of a scale smaller than that of the distribution switch 31-2.

A signal distribution circuit 30-2 comprises: the distribution switch 31-1 having four information signal inputs 32 and two distribution signal outputs 33; and the two distribution switches 31-3 having two information signal inputs 32 and two distribution signal outputs 33. Four of the five information signals 1 are inputted to the four information signal inputs 32 of the distribution switch 31-1. The remaining one information signal 1 is distributed to two signals and are inputted to one of the two information signal inputs 32 of each of the two distribution switches 31-3. Signals from the two distribution signal outputs 33 of the distribution switch 31-1 are inputted to the remaining one of the two information signal inputs 32 of each of the two distribution switches 31-3. Signals from the four distribution signal outputs 33 of the two distribution switches 31-3 are outputted as four distribution signals from the signal distribution circuit 30.

According to the embodiment, the information signal 1 which is directly inputted to the distribution switch 31-3 which is frequently selected always can be distributed to an arbitrary subscriber. An arbitrary one of the four information signals 1 which are inputted to the distribution switch 31-1 which is not so frequently selected is selected by each of the two distribution switches 31-3 and can be distributed to each subscriber.

In order to distribute the five information signals 1 to the four distribution signals 4 by a matrix type switch, a switch of the (5×4) matrix type is needed. However, such a switch is realized by combining switches of a small scale. Although the embodiment has been shown as a small scale such that the signals are distributed to four distribution signals 4, when the number of channels and the number of subscribers increase, the effect of reducing the scale becomes remarkable. Although the two distribution switches 31-3 have been used in the embodiment, the effect of reducing the scale becomes remarkable by using a further larger number of distribution switches.

When information to be distributed and subscribers are classified in association with a variety of kinds of services of cable television, the signal distribution circuit and the optical distribution circuit are used in a composite form. An embodiment of the composite signal distribution circuit and optical distribution circuit will now be described.

Figure 20:
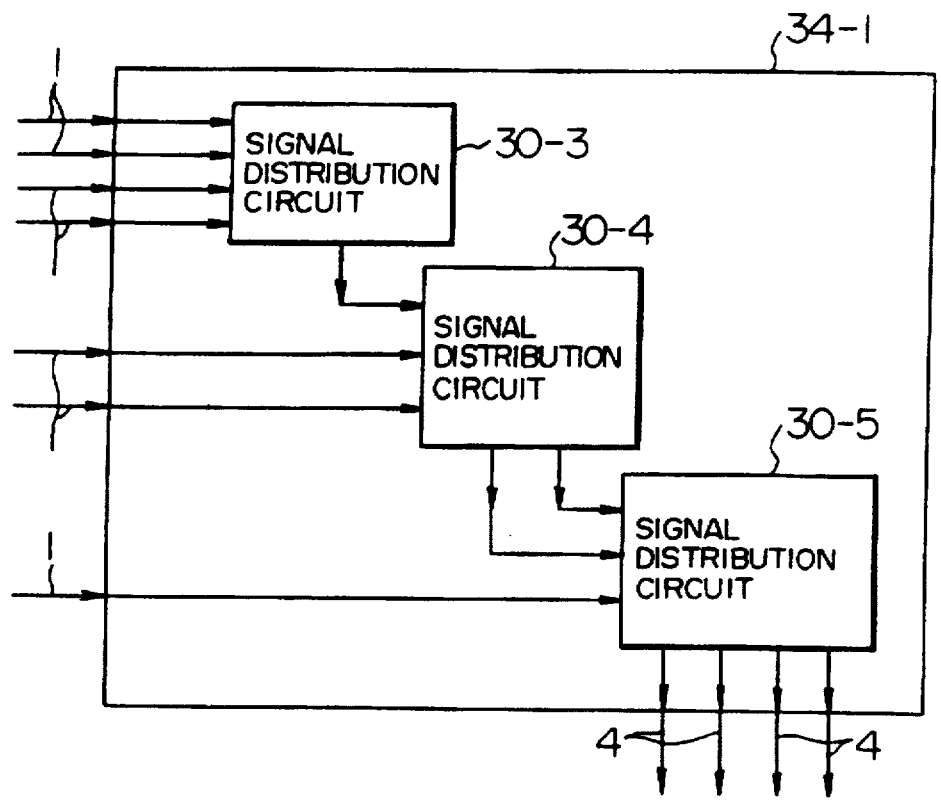
FIG. 20 is a constructional diagram of a composite signal distributor according to the invention.

FIG. 20 shows a construction of an embodiment of a composite distribution circuit 34-1 in which an information signal which is not so frequently used is selected a plurality of times. The composite distribution circuit 34-1 comprises three signal distribution circuits 30. Four information signals 1 are inputted to a signal distribution circuit 30-3 and one of them is selected and outputted. The one signal outputted from the signal distribution circuit 30-3 and the two information signals 1 are inputted to a signal distribution circuit 30-4. The signal distribution circuit 30-4 selects two of the three inputted signals and outputs. The two signals outputted from the signal distribution circuit 30-4 and the one information signal 1 are inputted to a signal distribution circuit 30-5. An arbitrary one of the three inputted signals is selected and outputted as a distribution signal 4 from each output of the signal distribution circuit 30-5.

Since the signal selecting process has been executed a plurality of times in the embodiment, particularly, in a system which serves a number of kinds of information in which the number of opportunities of selection is small, the switch scale can be effectively reduced.

Figure 21:
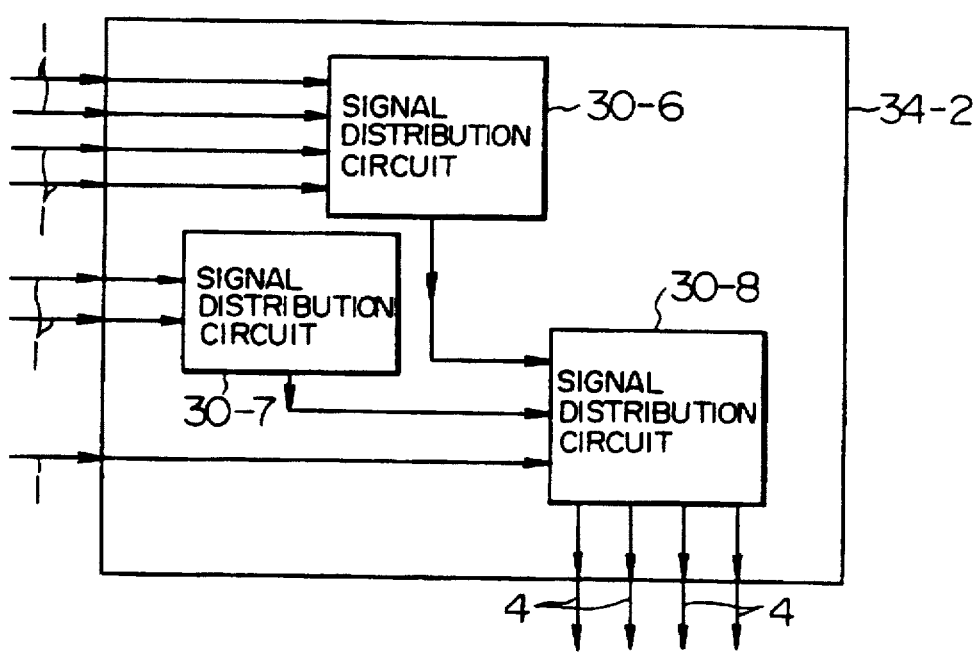
FIG. 21 is a constructional diagram of a composite signal distributor according to the invention.

FIG. 21 is a constructional diagram of an embodiment of a composite distribution circuit 34-2 in which the information signals 1 selected by a plurality of signal distribution circuits 30-6, 30-7 are inputted in parallel to the signal distribution circuit 30-8 which outputs the distribution signals 4.

The composite distribution circuit 34-2 comprises three signal distribution circuits 30-6, 30-7, and 30-8. Four information signals 1 are inputted to the signal distribution circuit 30-6. Two information signals 1 are inputted to the signal distribution circuit 30-7. One of the information signals 1 is selected and outputted by each of the signal distribution circuits 30-6 and 30-7. One signal which is outputted from each of the signal distribution circuits 30-6 and 30-7 and another information signal 1 are inputted to the signal distribution circuit 30-8. An arbitrary one of the inputted three signals is selected and outputted as a distribution signal 4 from each output of the signal distribution circuit 30-8.

In the embodiment, since different kinds of information signals can be selected by the signal distribution circuit suitable for them, the scale can be effectively reduced in a system for distributing a variety of information.

Figure 22:
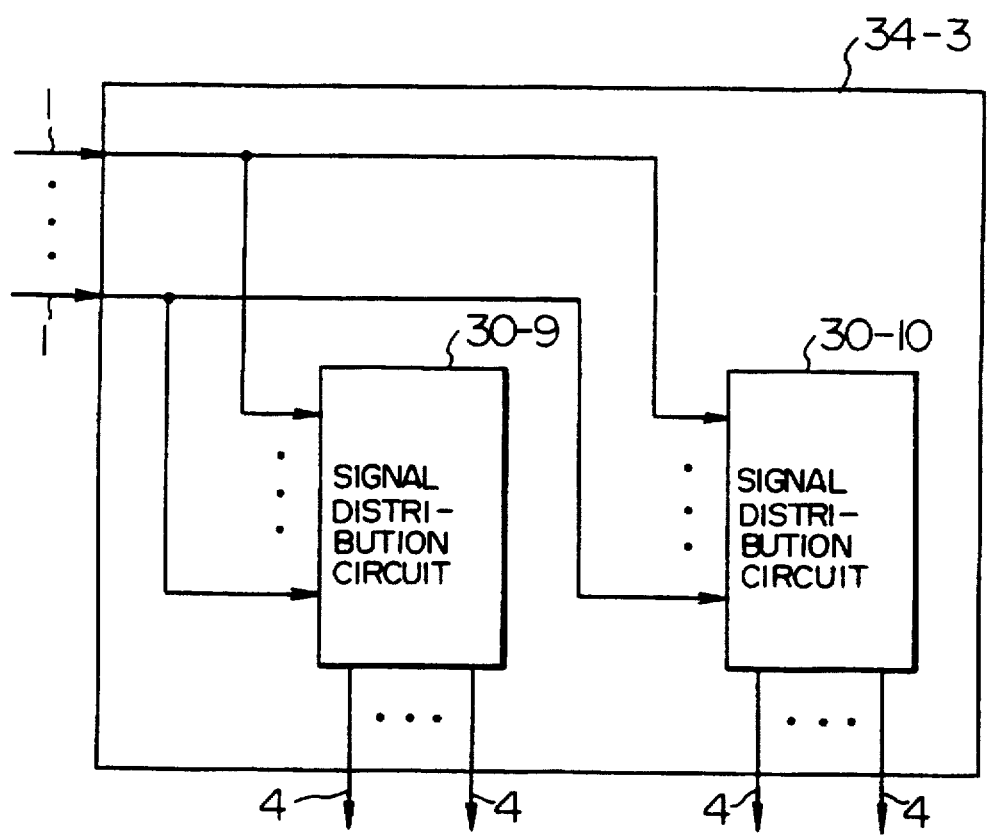
FIG. 22 is a constructional diagram of a composite signal distributor according to the invention.

FIG. 22 shows a construction of an embodiment of a composite distribution circuit 34-3 for distributing signals to different kinds of subscribers by a plurality of signal distribution circuits 30.

The composite distribution circuit 34-3 comprises two signal distribution circuits 30-9 and 30-10. The inputted information signals 1 are separated and inputted to the signal distribution circuits 30-9 and 30-10. Each of the signal distribution circuits 30-9 and 30-10 outputs the distribution signals 4 to the subscribers.

According to the invention, by using the signal distribution circuits 30 in correspondence to the differences of channel selection frequencies which differ in dependence on the differences among the kinds of subscribers, the enlargement of the switch scale can be suppressed.

As signal distribution circuits 30 in the composite distribution switch 34 of the invention, arbitrary conventional switches including the signal distribution circuits 30-1 and 30-2 in the embodiment can be used.

FIGS. 23, 24, and 25 show constructions of composite optical distribution circuits 40-1, 40-2, and 40-3 corresponding to the composite distribution circuits 34-1, 34-2, and 34-3, respectively.

The constructions, operations, and effects of those composite optical distribution circuits are similar to those of the above composite distribution circuits. As optical distribution circuits 6 which are used in the composite optical distribution circuits 40-1 to 40-3, the optical distribution circuits 6-1 to 6-4 can be used. The number of inputs and the number of outputs of each optical distribution circuit 6 are not limited to the numbers shown in the embodiments but an optical distribution circuit 6 having a larger number of inputs and outputs can be also used.

Figure 26:
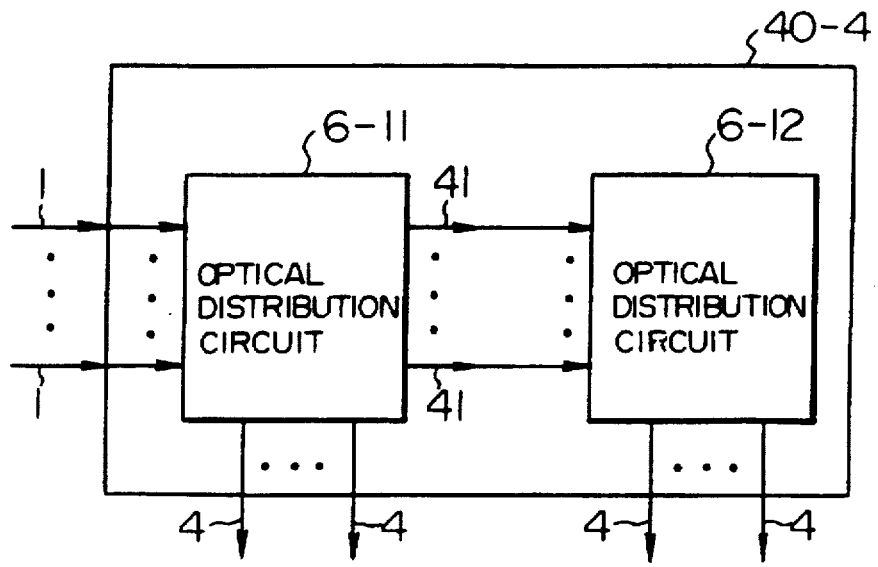
FIG. 26 is a constructional diagram of a composite optical distribution circuit according to the invention.

FIG. 26 is a constructional diagram of a composite optical distribution circuit 40-4 having the same function as that of the composite optical distribution circuit 40-3. The inputted information signals 1, however, are inputted to an optical distribution circuit 6-11. Photosignals 41 from the optical outputs 13 of the optical distribution devices 10 constructing the optical distribution circuit 6-11 are inputted to an optical distribution circuit 6-12. In a manner similar to the composite optical distribution circuit 40-3, the distribution signals 4 which are outputted from the composite optical distribution circuit 40-4 are signals which are outputted from the optical distribution circuits 6-11 and 6-12.

Since the embodiment can be realized by connecting a plurality of optical distribution circuits in place of separating the signals and distributing to a plurality of optical distribution circuits, the optical lines can be simplified.

Figure 27:
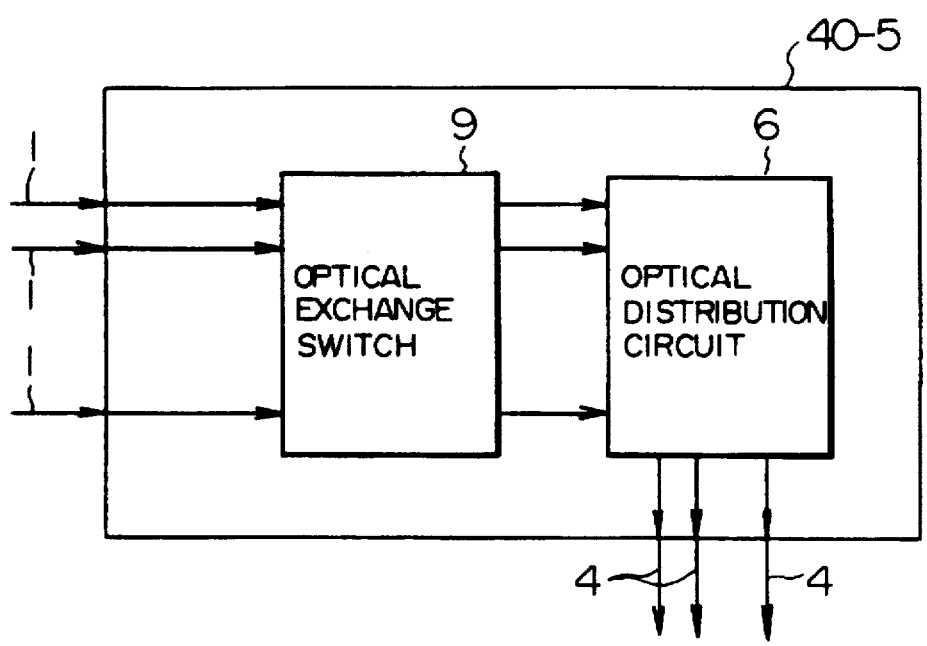
FIG. 27 is a constructional diagram of a composite optical distribution circuit according to the invention.

In a system of an optical cable television, a program rating of each channel changes in dependence on a time zone or a day of the week. In a system in which a frequency at which an information signal is selected changes, when the selection frequency of the input information is matched with the maximum time zone, a capacity and a scale of the system are enlarged. By exchanging the channel whose selection frequency was raised and the channel whose selection frequency was reduced in accordance with the time zone, the enlargement of the scale of the optical distribution circuit can be suppressed. FIG. 27 shows an embodiment of an optical distribution circuit in which the inputs of the information signals are exchanged in accordance with the time.

A composite optical distribution circuit 40-5 comprises an optical exchange switch 9 and the optical distribution circuit 6. The information signals 1 are inputted to the optical exchange switch 9 and are outputted while exchanging the order in accordance with the selection frequencies of the information signals 1. Output signals of the optical exchange switch 9 are inputted to the optical distribution circuit 6 whose scale is reduced by using differences of the selection frequencies. In the optical distribution circuit 6, an arbitrary information signal 1 to each subscriber is selected and outputted as a distribution signal 4.

According to the embodiment, the scale can be effectively reduced in a system in which information having selection frequencies which change with the elapse of time is distributed.

Figure 28A:
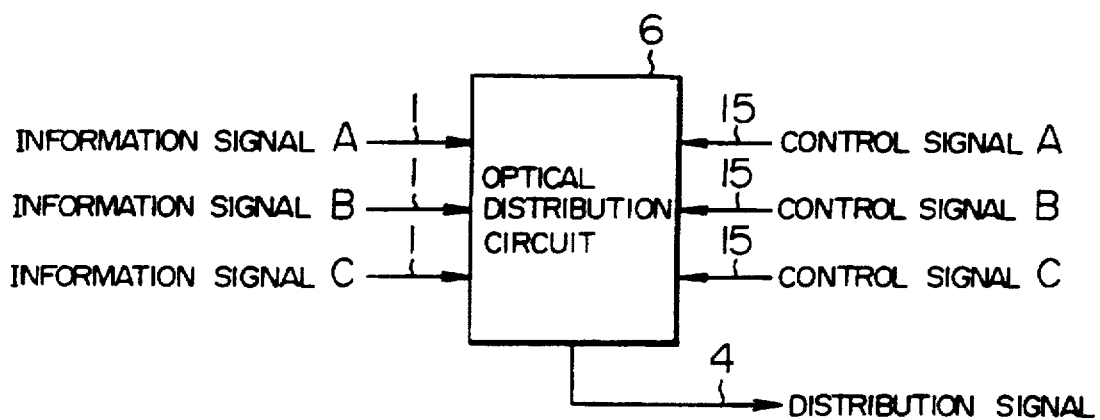
FIGS. 28A and 28B are a constructional diagram of an optical distribution circuit for a time division multiplex and a diagram showing signal waveforms.
Figure 28B:
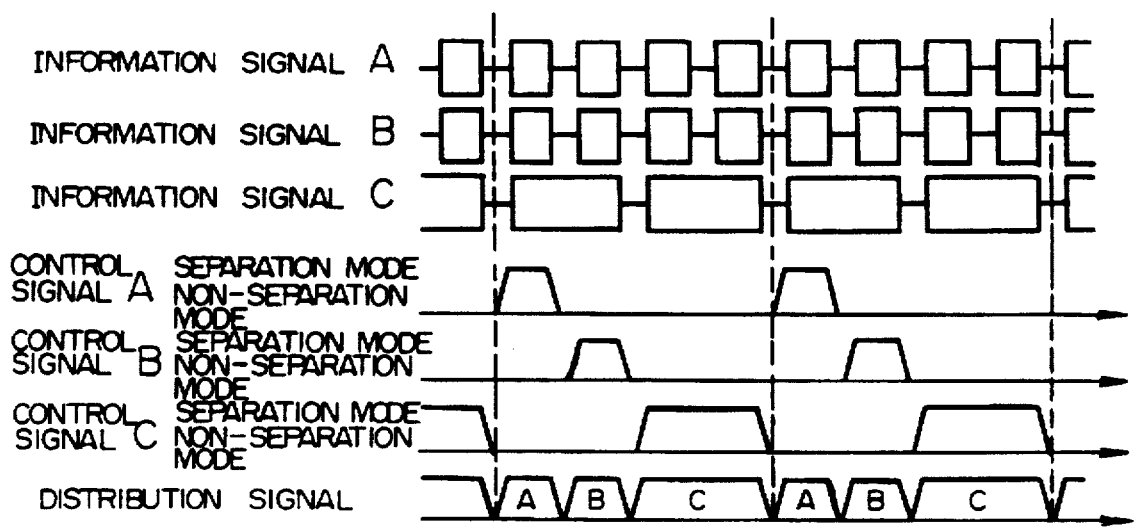

When a photosignal is handled as a data train which was digitized, a plurality of information can be outputted as one signal by time division multiplexing. FIGS. 28A and 28B show a construction of input and output signals of the optical distribution circuit used in a time-division multiplexing technique and a time change of each signal.

Three information signals 1 of A, B, and C are inputted to the optical distribution circuit 6 and are controlled by three control signals 15 of A, B, and C and are outputted as distribution signal 4. As shown in FIG. 28B, each of the information signals 1 is synchronized by a period divided by broken lines. For example, in the case of the information signal A, the signal comprising a combination of data trains A0, A1, A2, and A3 is repetitively outputted four times for the period of time divided by the broken lines and is sequentially outputted in accordance with the order. In the case of the information signal B as well, the signal is similarly repetitively outputted four times. In the case of the information signal C, a data train of a length that is about twice as long as the above data train is repetitively outputted twice. Those three control signals 15 are matched with each data train which is selected and are set into the separation mode so as not to be overlapped with the other control signals with respect to time. The output signal which is outputted as a distribution signal 4 is a signal in which three information signals were time-division multiplexed.

The embodiment can provide a plurality of information signals to one subscriber by time-division multiplexing the synchronized data train by using the information signals.

In the invention shown by the embodiment, the number of inputs and the number of outputs are not limited to 3 and 1, respectively, but the invention also can be applied to a larger number of input and output signals. A length of period to be synchronized and the number of repetition times are also not limited to those shown in the embodiment but also can be arbitrarily set.

Figure 29:
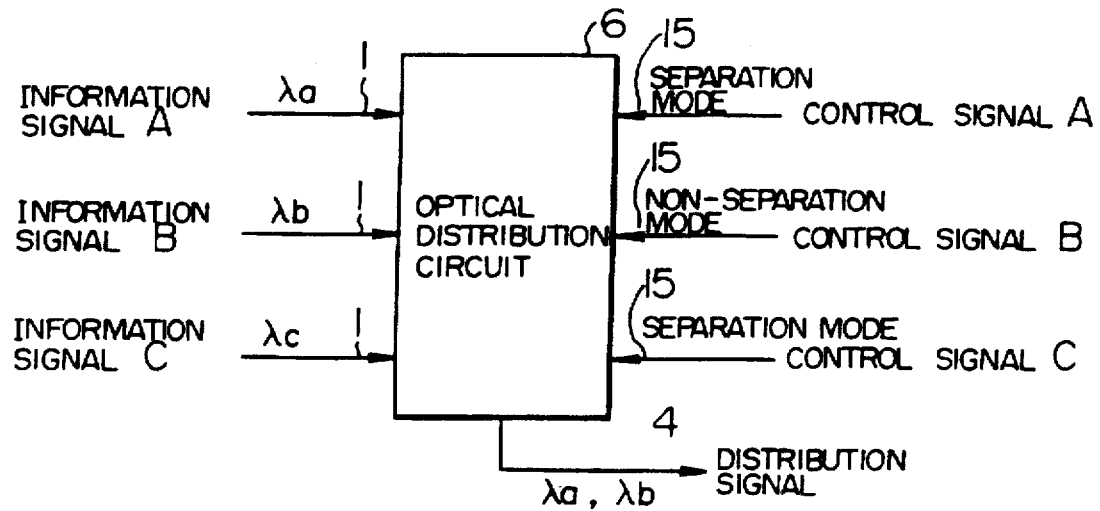
FIG. 29 is a constructional diagram of an optical distribution circuit for wavelength division multiplex.

An embodiment in which the photosignal which was wavelength-division multiplexed or frequency-division multiplexed is distributed will now be described. FIG. 29 shows a construction in which the wavelength-division multiplexed signal is distributed. Three information signals 1 of A, B, and C are inputted to the optical distribution circuit 6. The information signals A, B, and C have different wavelengths $\lambda a$, $\lambda b$, and $\lambda c$. The control signals 15 corresponding to the information signals A, B, and C are the control signals A, B, and C and input the separation mode, non-separation mode, and separation mode, respectively. The signals A and B in the separation mode are wavelength-division multiplexed and outputted as a distribution signal 4.

According to the embodiment, by using the information signals of different wavelengths, the wavelength-division multiplexed signal can be distributed to the subscriber.

In the invention shown by the embodiment, the number of inputs and the number of outputs are not limited to 3 and 1, respectively, but the invention also can be applied to a larger number of input and output signals. The number of signals which can input the separation modes is also not limited to 2 but also can be arbitrarily set.

Further, an arbitrary photosignal in which wavelength characteristics of the light power dividing and propagation direction changing means 20 and wavelength characteristics of the optical amplifying sections 16 and 17 lie within an almost predetermined wavelength range can be used.

Figure 30:
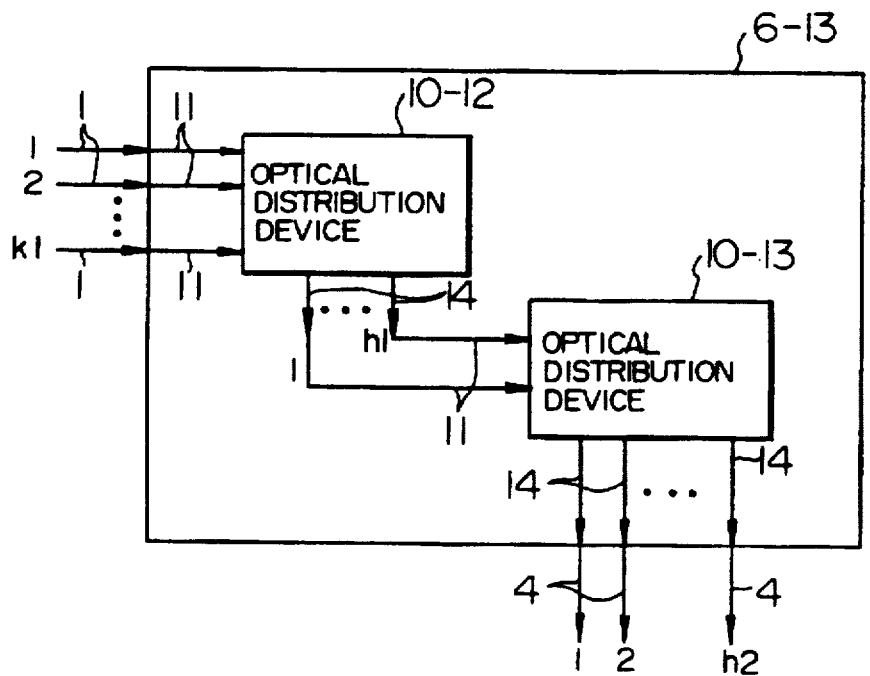
FIG. 30 is a constructional diagram of an optical distribution circuit according to the invention.

FIG. 30 shows a fundamental construction for explaining the effect of scale reduction in the optical distribution circuit 6 of the invention. An optical distribution circuit 6-13 in the embodiment comprises: an optical distribution device 10-12 having (k1) first optical paths and (h1) second optical paths; and an optical distribution device 10-13 having (h1) first optical paths and (h2) second optical paths.

(k1) information signals 1 are inputted to the optical inputs 11 of the optical distribution device 10-12 and (h1) signals are selected from the (k1) signals. The selected (h1) photosignals are outputted from the optical outputs 14 and inputted to the optical inputs 11 of the optical distribution device 10-13. The optical distribution device 10-13 outputs the distribution signals 4 from the (h2) optical outputs 14 in order to distribute the signals to (h2) subscribers of the number larger than the number (h1) of signals.

The (k1) information signals 1 can be distributed to the (h2) distribution signals 4. Since k1>h1 and h1<h2, the scale in which the optical distribution circuits of (k1×h2) are needed in the matrix type can be realized by the two small optical distribution circuits 10 of (k1×h1) and (h1×h2).

FIG. 31 shows an embodiment in which the method of constructing the distribution circuit in the present invention was applied to a time switch.

The embodiment comprises: a request control circuit 50; an information memory 51 having (h) memory cells; a write control circuit 52; and a read control circuit 53. The request control circuit 50 controls the write control circuit 52 and the read control circuit 53 in accordance with the inputted request signal 5. The write control circuit 52 inputs the information signal 1 in which (m) data trains were time-division multiplexed and writes the data train of the selected channel into the memory cell in the information memory 51 which was designated by the request control circuit 50. In a switch in which all of the channels are frequently selected, it is necessary that the values of (h) and (m) are equal. In the case where all of the channels are not always selected, however, it is possible to use the (h) memory cells of the number which is smaller than (m) and (h) denotes the maximum number of channels which can be selected. The read control circuit 53 outputs the distribution signal 4 in which (n) data trains were time-division multiplexed. In the case of outputting the time-division multiplexed signal at same speed as that of the information signal 1 which is inputted, the values of (m) and (n) are equal.

In the conventional time switch, the values of (m), (n), and (h) are equal. In the embodiment, when the subscriber who selects the same channel, even in the case where the values of (m) and (n) are equal, the system can operate even if the value of (h) is smaller than the value of (m:m=n).

In the case where a probability such that the channels to be selected are overlapped as in the cable television system is large, the value of (h) can be suppressed to a small value. On the other hand, when the number (n) of outputs is set to the maximum number of viewers and the time-division multiplexed signal is spatially distributed, by skipping the subscribers who are not watching and listening to the television program, the scale can be reduced.

According to the present invention as mentioned above, since the functions to distribute and select the photosignal can be realized by light power dividing and propagation direction means, the device can be miniaturized. On the other hand, according to the invention, since only the selected and separated photosignal is optically amplified, the signal which is not selected is not amplified. Therefore, there is an effect such that electric power consumption is suppressed. Moreover, there is also an effect such that in the case where the number of channels and the number of subscribers is increased, by additionally arranging optical distribution devices for coping with such increases in numbers to the optical distribution circuit which has already been installed, the system can easily cope with such a case.

In an optical distribution circuit of the matrix type, where the number of channels and the number of subscribers are increased so that the scale is too large in the matrix type optical distribution circuit, there is an effect such that the circuit scale is reduced by the method of synthesizing the distribution circuit according to the invention. Further, even in a general distribution switch such as a space switch or time switch, the scale can be also effectively reduced by the distribution circuit synthesizing method of the invention.

In the optical distribution circuit according to the invention, many kinds of connections according to the system which is used can be easily performed. By using a construction suitable for the system, there is an effect such that the circuit scale can be effectively reduced.

The optical distribution circuit according to the invention also can be applied to a time-division multiplexing system or a wavelength-division multiplexing system.

Although, the present invention has been described in detail, it should be understood that various changes, substitutions and alterations can be made hereto without departing from the spirit and scope of the present invention as defined by the appended claims.

What is claimed is:

1. An optical distribution system comprising:

an optical signal supplier for supplying at least m photosignals;

an optical signal delivery circuit for delivering at least n photosignals; and a time switch having m inputs connected to said optical signal supplier and n outputs connected to said optical signal delivery circuit, said time switch comprising:

a memory having h memory cells, wherein m>h and n>h, wherein h, m, and n are integers, a write controller, operatively associated with said memory, which controls writing from said m inputs to said h memory cells, and a read controller, operatively associated with said memory, which controls reading from said h memory cells to said n outputs.

2. An signal distribution system comprising:

a signal supplier for supplying at least m signals;

a signal delivery circuit for delivering at least n signals; and a time switch having m inputs connected to said signal supplier and n outputs connected to said signal delivery circuit, said time switch comprising:

a memory having h memory cells, wherein m>h and n>h, wherein h, m, and n are integers a write controller, operatively associated with said memory, which controls writing from said m inputs to said h memory cells, and a read controller, operatively associated with said memory, which controls reading from said h memory cells to said n outputs.

* * * * *